(12) United States Patent
Decoux

(10) Patent No.: US 11,847,516 B2
(45) Date of Patent: Dec. 19, 2023

(54) METHOD AND DEVICE FOR READING A TWO-DIMENSIONAL ENCODED PATTERN APPLIED ON A NON-UNIFORM BACKGROUND

(71) Applicant: SICPA HOLDING SA, Prilly (CH)

(72) Inventor: Eric Decoux, Vevey (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 17/786,935

(22) PCT Filed: Dec. 10, 2020

(86) PCT No.: PCT/EP2020/085532
§ 371 (c)(1),
(2) Date: Jun. 17, 2022

(87) PCT Pub. No.: WO2021/122311
PCT Pub. Date: Jun. 24, 2021

(65) Prior Publication Data
US 2023/0028616 A1 Jan. 26, 2023

(30) Foreign Application Priority Data
Dec. 17, 2019 (EP) ..................................... 19216918

(51) Int. Cl.
*G06K 19/06* (2006.01)
(52) U.S. Cl.
CPC . *G06K 19/06037* (2013.01); *G06K 19/06093* (2013.01)

(58) Field of Classification Search
CPC .................................. G06K 19/06; G06K 7/10
See application file for complete search history.

(56) References Cited

U.S. PATENT DOCUMENTS

| 6,813,366 B1 * | 11/2004 | Rhoads | H04N 1/32288 |
| | | | 707/E17.112 |
| 7,780,089 B2 * | 8/2010 | Wang | G06K 7/10722 |
| | | | 235/462.46 |
| 9,141,899 B2 | 9/2015 | Decoux et al. | |

(Continued)

OTHER PUBLICATIONS

Rafael C. Gonzalez and Richard E. Woods, "Digital Image Processing", third Edition (2008), Pearson Prentice Hall, see chapter 9, pp. 628-679.

(Continued)

*Primary Examiner* — Thien M Le
(74) *Attorney, Agent, or Firm* — Muncy, Geissler, Olds & Lowe, P.C.

(57) ABSTRACT

The invention relates to a method and device for detecting and decoding a two-dimensional encoded pattern, e.g. of the Robust Encoding Pattern type (REP), even in case the pattern is applied on a non-uniform colored background of a surface of a substrate. The operations for decoding such an encoded pattern involve detecting the states of its symbols through a test pattern, checking that local differences between parameter values of the elements of the symbols are consistent with an allowed representation of the test pattern to assign via a one-to-one mapping the states of the symbols of the test pattern to the corresponding symbols of the encoded pattern, and decoding the encoded pattern based on the assigned representation of its symbols.

12 Claims, 9 Drawing Sheets

(56) References Cited

U.S. PATENT DOCUMENTS

| | | |
|---|---|---|
| 9,224,028 B2 | 12/2015 | Decoux et al. |
| 2003/0112471 A1* | 6/2003 | Damera-Venkata .......................... G06K 19/06028 235/494 |
| 2006/0097054 A1* | 5/2006 | Biss .................... G06K 7/10851 235/462.25 |
| 2008/0267537 A1* | 10/2008 | Thuries ................ G06K 7/1095 382/321 |
| 2010/0147956 A1* | 6/2010 | Wang ................. G06K 7/10801 235/472.01 |
| 2010/0170951 A1* | 7/2010 | Silverbrook ......... B41J 11/0005 235/494 |
| 2012/0318870 A1* | 12/2012 | Ren ........................ H04N 25/46 235/469 |
| 2013/0248605 A1* | 9/2013 | Barber ............... G06K 7/10821 235/462.28 |
| 2016/0314330 A1 | 10/2016 | Decoux et al. |
| 2016/0321473 A1 | 11/2016 | Decoux et al. |
| 2018/0025263 A1* | 1/2018 | Toyoizumi ......... G06K 19/0614 235/494 |
| 2022/0212115 A1* | 7/2022 | Matsuno ............... G06K 7/1417 |

OTHER PUBLICATIONS

ISO/IEC 16022, Information technology—Automatic identification and data capture techniques—Data Matrix bar code symbology specification, 2nd ed. Sep. 15, 2006, 142 pages.

ISO/IEC 15415, Information technology—Automatic identification and data capture techniques—Bar code print quality test specification—Two-dimensional symbols, 2nd ed. Dec. 15, 2011, 58 pages.

N. Otsu (1979): "A threshold selection method from gray-level histograms", IEEE Transactions on Systems, Man, and Cybernetics, vol. 19 (1), 62-66, Jan. 1979.

International Search Report and Written Opinion issued with respect to application No. PCT/ EP2020/085532.

* cited by examiner

METHOD AND DEVICE FOR READING A TWO-DIMENSIONAL ENCODED PATTERN APPLIED ON A NON-UNIFORM BACKGROUND

TECHNICAL FIELD

The present invention relates to the technical field of reading and decoding two-dimensional patterns of encoded data, e.g. two-dimensional barcodes, which have been marked on a surface of an item or on a label applied on an item. The invention is particularly adapted to read and decode two-dimensional patterns such as those disclosed in the U.S. Pat. Nos. 9,141,899 B2 and 9,224,028 B2.

BACKGROUND OF THE INVENTION

Currently, articles can be identified by a mark or a logo inscribed on a package of the article or on the article itself. These inscriptions are visible and enable the article to be identified by all users. It is also possible to use other visible identifiers containing encrypted information so that the content of the identifier cannot be recognized by all users: for example, one-dimensional identifiers of the barcode type or two-dimensional identifiers of the data matrix type, usually printed on a surface, and which are the most widely used.

The barcodes represent information using a pattern consisting of bars with different thicknesses and spacings that can easily be decrypted.

Generally, identifiers of the "data matrix" type use white and black modules (i.e. set of pixels) forming an identification pattern and which are arranged within the pattern in a rectangular or quadratic form. Such a data matrix is identified by two adjacent solid areas in the form of an "L", which has a whole is called "identifying pattern", and two edges formed by alternating white and black modules, called "clock". The "L" shaped pattern is used to locate and orient the identification pattern and the so-called "clock" pattern is used to count the number of columns and rows in the identification pattern. Furthermore, the "data matrix" also requires a so-called "blank" area, sometimes called "quiet zone", for the identifying pattern to be detected. This so-called "blank" area is used to clearly isolate the identifying pattern from any other element of the article with which it might be confused. These identifiers, visible to the user, notably through their identifying pattern and their detection area, must be marked in a specifically chosen place on the article in order not to detract from its general appearance. Moreover, the identifying pattern is a known and constant pattern regardless of the article to be identified. This identifying pattern does not contain any information and is used only to detect the identification pattern.

Furthermore, these data matrices, despite being provided with error correction mechanisms, are not sufficiently robust because they depend on the substrate on which they are applied. In practice, depending on unevenness of the substrate, the latter may degrade the pattern when it is marked on the article. The robustness of such a pattern also depends on the print quality, because a printing defect, for example an ink which spreads or an absence of printing of a module, may greatly affect the pattern. For example, a data matrix with a dimension of 16 modules by 16 modules may also be rendered illegible by the destruction of more than six modules.

In view of these defects of the conventional identification patterns, a two-dimensional pattern for coding a numerical information item which enhances the robustness of the identification of conventional articles and that can be printed and read even when the print quality is poor but also when the resolution used is fine (for example at least 300 dots per inch (DPI), preferably between 300 DPI and 600 DPI) has been disclosed in the U.S. Pat. Nos. 9,141,899 B2 and 9,224,028 B2. This 2D pattern for coding data on a surface of a substrate, referred to as "Robust Encoding Pattern", or REP, comprises (see details in the above cited US patents) at least one reference pattern from a finite set of allowed reference patterns, each allowed reference pattern comprising a specific arrangement of a plurality of symbols belonging to a finite set of two-dimensional symbols, each symbol in the arrangement being intended for the coding of a portion of said data, each symbol having a plurality of valid states corresponding to distinct authorized representations, a state of a symbol consisting in a specific arrangement of a plurality of two-dimensional elements (e.g. E1, E2) within the symbol, each element E being characterized by a corresponding value of a parameter p(E), the parameter of one element E1 of each valid state of a symbol having a value different from a value of a parameter of at least one other element E2 of said plurality of elements. An example of such a REP is illustrated on FIG. 1 and FIG. 3 of the U.S. Pat. No. 9,141,899 B2, and detailed from column 5, line 47 to column 11, line 30. The symbols of the set of symbols may all be different. However, the symbols of the set of symbols may be identical (e.g. have the same shape), in other words, the set of symbols comprises only one symbol.

An example of such a two-dimensional pattern (REP), to be decoded according to the invention, is shown on FIG. 1A-C and FIG. 2. FIG. 1A illustrates an arrangement of thirty-two symbols forming a two-dimensional (reference) pattern P (each symbol having a specific position within the pattern). In FIG. 1A, the symbols of P are obtained from a set of four (basic) symbols A, B, C and D forming an alphabet (i.e. a finite set of two-dimensional symbols): in this example, the basic symbols are identified by both their shape (identical in this example) and orientation (e.g. A and B have the same oval shape but differ in orientation, idem for C and D), although the shapes may generally differ from one symbol to another. In order to better visualize the two-dimensional symbols and their positions, they are represented with their boundaries (i.e. a thin line). However, such boundaries are not necessarily marked when the symbols (together with their elements) are applied on a surface (see FIG. 2, bottom). Each symbol of the two-dimensional pattern P may have a plurality of possible representations, which increases the number of combinations of representations of one and the same reference pattern. In practice, a pattern that has a given arrangement of symbols may have a plurality of possible distinct representations corresponding to possible states of each symbol. A state of a symbol corresponds to a specific arrangement of a plurality of elements (E1, E2) (here, for simplicity, the symbols only comprise two elements) characterized by their parameter values p(E1) and p(E2). Generally, an element of a symbol should be understood as being a surface portion marked to assign to it a value of a parameter capable to characterize this surface portion and make its detection possible with respect to at least one another element of the symbol. By way of non-limiting example, the elements may be surface portions in the form of spots or localized reliefs, which may have an approximately circular contour. Obviously, other forms are possible. The elements may be produced by printing an ink on the surface, by calendering, stamping or any other appropriate method. In the above-mentioned example, the elements E1 and E2 of a symbol respectively correspond to a black dot and a white dot (or even a "non-dot" if the local background allows discriminating the corresponding parameter value with respect to that of the black dot), their respective low and high parameter values being associated with "black" and "white" colors: thus, element E1 corresponds to a black dot (p(E1)→"black") and element E2 is a white dot (or non-dot, with p(E2)→"white"), as the value p(E1)<p(E2) in the symbol. Any colors (or distinct hues of a same color) could be used as parameter values instead of the black and white ones of this example. The elements of a symbol correspond to a (valid) state of that symbol only if at least two of these elements differ by their parameter values. In an invalid state of a symbol (not to be used for encoding data) at all the elements of the symbol have the same parameter value. Generally, the parameter value difference between two distinct elements may be any detectable difference, even if this difference cannot be detected by the naked eye. The elements can be chosen from the group comprising spots, imprints and reliefs, and said parameter may be included in the group formed by the colorimetric components, the depth, the height, the electromagnetic absorption, the magnetic properties (for example the magnetic permeability or susceptibility), the shape, the quantity of ink used, the electrical conductivity, the luminescence (fluorescence and/or phosphorescence). The colorimetric components may be the hue, the saturation, the lightness, known to those skilled in the art by the acronym "HSL" (Hue Saturation Lightness). Said parameter may be one of these components, for example the lightness for two elements of a black and white or even grey and dark grey colors. It is also possible to use another system, for example the red, green, blue system, well known to those skilled in the art by the acronym RGB.

A portion of said data of the symbol may be a binary value defined by the representation of the symbol. Thus, in the examples of FIG. 1-2, a pair of elements (E1,E2) of a symbol may correspond to one or more information bits whose value is defined, for example, according to the sign (or the amplitude) of the difference between the value of the parameter of the first element E1 of the pair and the value of the parameter of the second element E2 of the pair. It is also possible to assign a number of bits to a single pair of elements, for example by using a several parameters. The symbols of the pattern may define a binary value corresponding to said numerical information coded by the pattern. It is also possible to define an order of reading of the symbols arranged in a pattern to restore all the bits of the value coded by the pattern. The pattern may be marked within an image comprising pixels, said elements being modified pixels of the image and said parameter being at least one colorimetric pixel component.

In the example illustrated on FIG. 1B, two groups Vs1 and Vs2 of valid states (and the corresponding elements E1 and E2 with their respective parameter values) of the respective four basic symbols A, B, C and D of FIG. 1A, and two groups of invalid states Is1 and Is2 for these four basic symbols. The two valid states Vs1 and Vs2 may, for example, represent the respective values 0 and 1 in order to produce a binary coding of an information item (see details in the above-mentioned US patents).

FIG. 1C shows two possible representations P' and P''' of the (reference) pattern P of FIG. 1A. There are then a number of possibilities such as P', P''', etc. to represent the duly created pattern P. In practice, given the fact that in this example each symbol A, B, C, D can be represented by two distinct valid states Vs1, Vs2, and that the pattern P comprises 32 symbols, there are a priori $2^{32}$=4 294 967 296 possibilities for representing the determined pattern P (although only some of these representations may be allowed in fact). According to another example, if the pattern comprises 64 symbols, there are then $2^{64}$=18 446 744 073 709 551 616 possibilities for representing the determined pattern P. Thus, each representation of a pattern such as P may correspond to an information item, which makes it possible to characterize an article on which one possible representation of the pattern is affixed. For example, it is possible to characterize the manufacturing source of the article, its place of distribution, a production date and so on. All these information items make it possible to uniquely identify an article, and thus to fight counterfeiters, if said article is, for example, distributed by an unauthorized person. As a variant, the information item is exclusively referenced in the specific arrangement of the reference pattern P, the different representations P', P''' etc. being created randomly to render the information contained in the reference pattern P totally undetectable by an inexperienced person.

FIG. 1C illustrates two possible representations P' and P''' of the pattern P. For each possibility P' and P''', the elements E1, E2 of the states Vs1, Vs2 of the symbols A, B, C, D of the pattern P are represented. In the representation P', the symbol A1, for example, will be represented by its state Vs1, i.e. with a (black) dot E1 in the top portion and a white dot E2 in the bottom portion. Also, on the first horizontal row of the identification pattern P', the symbol B1 will be noted in its state Vs1, i.e. with a dot E1 on the left of the figure and a white dot E2 on the right of the figure. Still in the identification pattern P', the symbol C1 will also be noted, in its first state Vs1, i.e. with a dot E1 top left and a white dot E2 bottom right, these two elements being arranged on a diagonal in the abovementioned first direction. Also, in the representation P', the symbols A2, B2 and C2 will be noted, using the second state Vs2 and the symbols D1, D2 respectively using the states Vs1 and Vs2.

In the representation P''' on FIG. 1C, the symbol A1 indicated previously in the representation P' is identical whereas the symbol B1 is replaced by B2 represented with its second state Vs2, namely with a white dot E2 on the left and a dot E1 on the right. In other words, this symbol B in this position of the pattern P (see FIG. 1A) is used here with its representation corresponding to a valid state other than in the representation P'. Similarly, the symbol C mentioned previously, and denoted C1 in FIG. 10 for the representation P', is used for the representation P''' with its second state Vs2, namely with a white dot E2 top left and a dot E1 bottom right and denoted C2.

Observation of the two representations P' and P''' illustrated in FIG. 10 shows that a certain number of symbols A, B, C and D are thus used either in a first state Vs1, or in a second state Vs2, such that the two representations P' and P''' are totally different, although the same reference pattern P of FIG. 1A has been used.

FIG. 2 schematically represents a marking on an article SUB using the two representations P' and P''' of the reference pattern P as illustrated in FIG. 1A. In this example, for each representation P', P''' of the pattern P, the dot (or non-dot) representations of each symbol A, B, C, D of the pattern P have been marked on the article SUB (e.g. printed with an inkjet printer). It would obviously be possible to mark on the article only a single representation such as P', or even, a greater number of representations of the reference pattern P. If an observer does not know the reference pattern beforehand (even for a given disposition of symbols), it is therefore almost impossible to recognize it from the states represented as marked on the article SUB (as shown on FIG. 2, bottom). In particular, there is one chance in 4 294 967 296 of determining the pattern P, when the latter comprises thirty two symbols as illustrated in FIGS. 1 and 2. In the case where the pattern P comprises sixty four symbols, there is then one chance in $2^{64}$ of determining the pattern P.

The reference pattern P' or P" can also be used to encrypt a digital information item. The states Vs1, Vs2 of the symbols of the reference pattern are then used to code this digital information item. This digital information item may be a numerical value of binary type.

For example, it is possible to code the binary value 1100 (or 12 in decimal) with the first four symbols SP1, SP2, SP3, SP4 illustrated in FIG. 2 of the pattern P (corresponding to symbols A, B, C and D). For this, it is possible to establish the following code, for each symbol A, B, C, D of the pattern P: the first state Vs1 corresponds to the value 1 and the second state Vs2 corresponds to the value 0 (see FIG. 1B for the corresponding states Vs1 and Vs2). In this case, the first symbol SP1 of the representation P' of the pattern P of FIG. 2 corresponds to the value 1, the second symbol SP2 of the pattern P' corresponds to the value 1, the third symbol SP3 of the pattern P' corresponds to the value 0, the fourth symbol SP4 of the pattern P' corresponds to the value 0. Thus, the first four symbols represent the decimal value 12. It is also possible to choose other codes for which each first valid state of the symbols of the pattern P corresponds to 1 or 0, depending on the code chosen. This digital information item may be a date of birth, a product reference, for example a reference to its place of manufacture, its place of distribution, its content, a datum characteristic of the article on which the pattern is represented, etc.

As it is clear from above, decoding a two-dimensional pattern of REP type from a marking without knowing beforehand a reference pattern and its allowed representation(s) is quite impossible. Most often, a REP type marking comprises a plurality of reference patterns for providing better robustness, and decoding the marking necessitates knowing beforehand many reference patterns and their allowed representations. Moreover, the two-dimensional pattern may be marked on a surface portion of a substrate having a non-uniform background that makes the detection of the symbols of the pattern, and their states, particularly difficult. For example, the two-dimensional pattern may be applied on a bottle cap already comprising some variegated logo, possibly printed over a layer comprising brilliant colors and shadings. Detection of the two-dimensional pattern is further made difficult due to the fact that such pattern does not generally comprise any identifying pattern, such as the L-shape edges of a data matrix or the position squares of a QR code for example, for guiding the detection and decoding operations.

It is thus an object of the invention to provide a robust method of reliably detecting and decoding a marking composed of symbols having each a plurality of elements (e.g. of the REP type) applied on a surface of a substrate, even in case the marking is applied on a non-uniform background (modulated background). Moreover, a reader (suitably programmed), e.g. a smartphone, should be operable to implement the method and read said marking.

SUMMARY OF THE INVENTION

The invention relates to a method of reading data encoded in a two-dimensional pattern applied on a non-uniform background of a surface of a substrate, the two-dimensional pattern comprising at least one reference pattern from a finite set of allowed reference patterns, each reference pattern comprising a specific arrangement of a plurality of symbols belonging to a finite set of two-dimensional symbols, each symbol in the arrangement coding a portion of said data, a state of a symbol consisting in a specific arrangement of a plurality of two-dimensional elements (E1, E2) within the symbol, each element E being characterized by a corresponding value of a parameter p(E), the parameter of one element E1 of each state of a symbol having a value different from a value of a parameter of at least one other element E2 of the state, the method comprising the steps of:

acquiring a digital image of the two-dimensional pattern with an imaging unit of a reader having a processing unit and a memory, each pixel of the acquired digital image having associated corresponding values in a multidimensional color space, and storing the acquired digital image in the memory;

converting via the processing unit the pixel values of the acquired digital image into a one-dimensional color space to form a converted digital image by mapping the values associated with each pixel of the acquired digital image to one corresponding value in said one-dimensional color space, and storing the converted digital image in the memory;

scanning via the processing unit the converted digital image through a window and detecting reference patterns of the two-dimensional pattern, the window delineating a block of pixels of the converted digital image corresponding to a size of a reference pattern above which said window is positioned, by carrying out the operations of:

(i) selecting a test reference pattern among the set of allowed reference patterns stored in the memory;

(ii) selecting a window position with respect to the converted digital image to delineate a block of pixels of the converted digital image;

(iii) for each symbol of the test reference pattern, determining a state of the symbol by detecting through the window the respective parameter values of an arrangement of elements at a location on the converted digital image corresponding to that of said symbol in the test reference pattern, and by respectively assigning the detected parameter values to corresponding elements within the symbol, storing in the memory the assigned parameter values of its respective elements, the symbol having thus an assigned state comprising a pair of elements (E1, E2) wherein a first element E1 of the pair has an assigned parameter value p(E1) less than an assigned parameter value p(E2) of a second element E2 of the pair;

(iv) determining that a candidate representation of the test reference pattern, wherein each symbol of the test reference pattern has the assigned state given by the corresponding stored assigned parameter values of its respective elements, constitutes a valid representation of the test reference pattern only if the parameter value of each first element of any symbol of the candidate representation is less than the respective parameter values of the second elements of neighboring symbols; and (a) in case the candidate representation of the test reference pattern constitutes a valid representation of the test reference pattern, storing in the memory an indication that a reference pattern corresponding to the block of pixels on the converted digital image has a validated representation corresponding to said valid representation of the test reference pattern, shifting the window by at least one pixel at a new position corresponding to another block of pixels on the converted digital image, and performing steps (i) to (iv) with said another block of pixels; or (b) in case the candidate representation of the test reference pattern does not constitute a valid representation of the test reference pattern, performing steps (i) to (iv) with another test reference pattern, selected among the remaining allowed reference patterns stored in the memory; and decoding via the processing unit the data encoded in a reference pattern of the two-dimensional pattern by decoding the symbols of a corresponding validated representation of a selected test reference pattern.

According to the invention, at step (iv) the candidate representation of the test reference pattern may constitute a valid representation of said test reference pattern only if the parameter value of each first element of any symbol of the candidate representation is less than the respective parameter values of the second elements of all the other symbols of the candidate representation.

According to the above method, any state of the symbols of the allowed reference patterns may comprise at least one corresponding pair of elements. Moreover, any representation of the allowed reference patterns may comprise at least eight symbols, each symbol having its state represented by a corresponding pair of elements. The one-dimensional color space may be formed by assigning to each pixel of the acquired digital image a value resulting from a sum of weighted associated values of said pixel.

The above method may further comprise the steps of:
converting via the processing unit the pixel values of the acquired digital image into a new one-dimensional color space, distinct from the one-dimensional color space, to form a new converted digital image by mapping the values associated with each pixel of the acquired digital image to one corresponding value in said new one-dimensional color space, and storing the new converted digital image in the memory;

performing the operation of scanning via the processing unit the new converted digital image through the window and detecting reference patterns of the two-dimensional pattern, and performing the operations (i) to (iv) with said new converted digital image in place of the converted digital image to obtain a validated representation of a selected test reference pattern; and performing the operation of decoding via the processing unit the data encoded in a reference pattern of the two-dimensional pattern by decoding the symbols of at least one corresponding validated representation of a selected test reference pattern.

The invention also relates to a reader equipped with an imaging unit, a processing unit and a memory, operable to acquire and perform image processing of a digital image of a two-dimensional pattern applied on a non-uniform background of a surface of a substrate and representing encoded data, the two-dimensional pattern comprising at least one reference pattern from a finite set of allowed reference patterns stored in the memory, each symbol in the arrangement coding of a portion of said data, a state of a symbol consisting in a specific arrangement of a plurality of two-dimensional elements (E1, E2) within the symbol, each element E being characterized by a corresponding value of a parameter p(E), the parameter of one element E1 of each state of a symbol having a value different from a value of a parameter of at least one other element E2 of the state, the reader being further adapted to:

acquire a digital image of the two-dimensional pattern with the imaging unit, each pixel of the acquired digital image having associated corresponding values in a multidimensional color space, and store the acquired digital image in the memory;

convert via the processing unit the pixel values of the acquired digital image into a one-dimensional color space to form a converted digital image by mapping the values associated with each pixel of the acquired digital image to one corresponding value in said one-dimensional color space, and store the converted digital image in the memory;

scan the converted digital image through a window and detect reference patterns of the two-dimensional pattern via image processing running on the processing unit, the window delineating a block of pixels of the converted digital image corresponding to a size of a reference pattern above which said window is positioned, by carrying out via the processing unit the operations of:

(i) selecting a test reference pattern among the set of allowed reference patterns stored in the memory;

(ii) selecting a window position with respect to the converted digital image to delineate a block of pixels of the converted digital image;

(iii) for each symbol of the test reference pattern, determining a state of the symbol by detecting through the window the respective parameter values of an arrangement of elements at a location on the converted digital image corresponding to that of said symbol in the test reference pattern, and by respectively assigning the detected parameter values to corresponding elements within the symbol, storing in the memory the assigned parameter values of its respective elements, the symbol having thus an assigned state comprising a pair of elements (E1, E2) wherein a first element E1 of the pair has an assigned parameter value p(E1) less than an assigned parameter value p(E2) of a second element E2 of the pair;

(iv) determining that a candidate representation of the test reference pattern, wherein each symbol of the test reference pattern has the assigned state given by the corresponding stored assigned parameter values of its respective elements, constitutes a valid representation of the test reference pattern only if the parameter value of each first element of any symbol of the candidate representation is less than the respective parameter values of the second elements of neighboring symbols; and (a) in case the candidate representation of the test reference pattern constitutes a valid representation of the test reference pattern, storing in the memory an indication that a reference pattern corresponding to the block of pixels on the converted digital image has a validated representation corresponding to said valid representation of the test reference pattern, shifting the window by at least one pixel at a new position corresponding to another block of pixels on the converted digital image, and performing operations (i) to (iv) with said another block of pixels; or (b) in case the candidate representation of the test reference pattern does not constitute a valid representation of the test reference pattern, performing operations (i) to (iv) with another test reference pattern, selected among the remaining allowed reference patterns stored in the memory, in place of the test reference pattern; and decoding via the processing unit the data encoded in a reference pattern of the two-dimensional pattern by decoding the symbols of a corresponding validated representation of a test reference pattern.

In the above operation (iv), the processing unit may determine that the candidate representation of the test reference pattern constitutes a valid representation of said test reference pattern only if the parameter value of each first element of any symbol of the candidate representation is less than the respective parameter values of the second elements of all the other symbols of the candidate representation.

In the above reader, the processing unit may form the one dimensional color space by assigning to each pixel of the acquired digital image a value resulting from a sum of weighted associated values of said pixel.

According to the invention, the reader may further be adapted to:

convert via the processing unit the pixel values of the acquired digital image into a new one-dimensional color space, distinct from the one-dimensional color space, to form a new converted digital image by mapping the values associated with each pixel of the acquired digital image to one corresponding value in said new one-dimensional color space, and storing the new converted digital image in the memory;

perform the operation of scanning via the processing unit the new converted digital image through the window and detecting reference patterns of the two-dimensional pattern, and perform operations (i) to (iv) with said new converted digital image in place of the converted digital image to obtain a validated representation of a selected test reference pattern; and perform the operation of decoding via the processing unit the data encoded in a reference pattern of the two-dimensional pattern by decoding the symbols of at least one corresponding validated representation of a selected test reference pattern.

The present invention will be described more fully hereinafter with reference to the accompanying drawings in which like numerals represent like elements throughout the different figures, and in which prominent aspects and features of the invention are illustrated.

DETAILED DESCRIPTION

According to the ISO standards, a data matrix consists of dark modules printed on a light background or vice versa. To ensure an accurate detection of the modules of a data matrix, a quiet zone has been included in the specification [1]. Due to a limited space reserved for data matrix symbols on a packaging or a value document (e.g. a passport), a data matrix symbol can be printed on a cluttered background. As a consequence of this deviation from optimal conditions, the data matrix cannot be reliably decoded.

A key step in a decoding algorithm of a data matrix is the detection of the data matrix in the acquired image by a camera. The reference decoding algorithm, as specified in the ISO standard [1] [2], applies a global thresholding method to the grey-scale image. The global threshold GT is specified as follows GT=(Rmax+Rmin)/2, where Rmax and Rmin are respectively the highest and the lowest grey-scales in the acquired image.

If the data matrix is printed on a cluttered background, then applying a global threshold could result in wrongly classifying a dark module as a light module. The global thresholding method and the Otsu's algorithm [3], a well-known thresholding method in the art, achieve good results when the histogram distribution of the grey-scales posse two peaks separated by a valley. This condition does not apply when a data matrix is printed on a cluttered or non-uniform background.

Figure 1A:
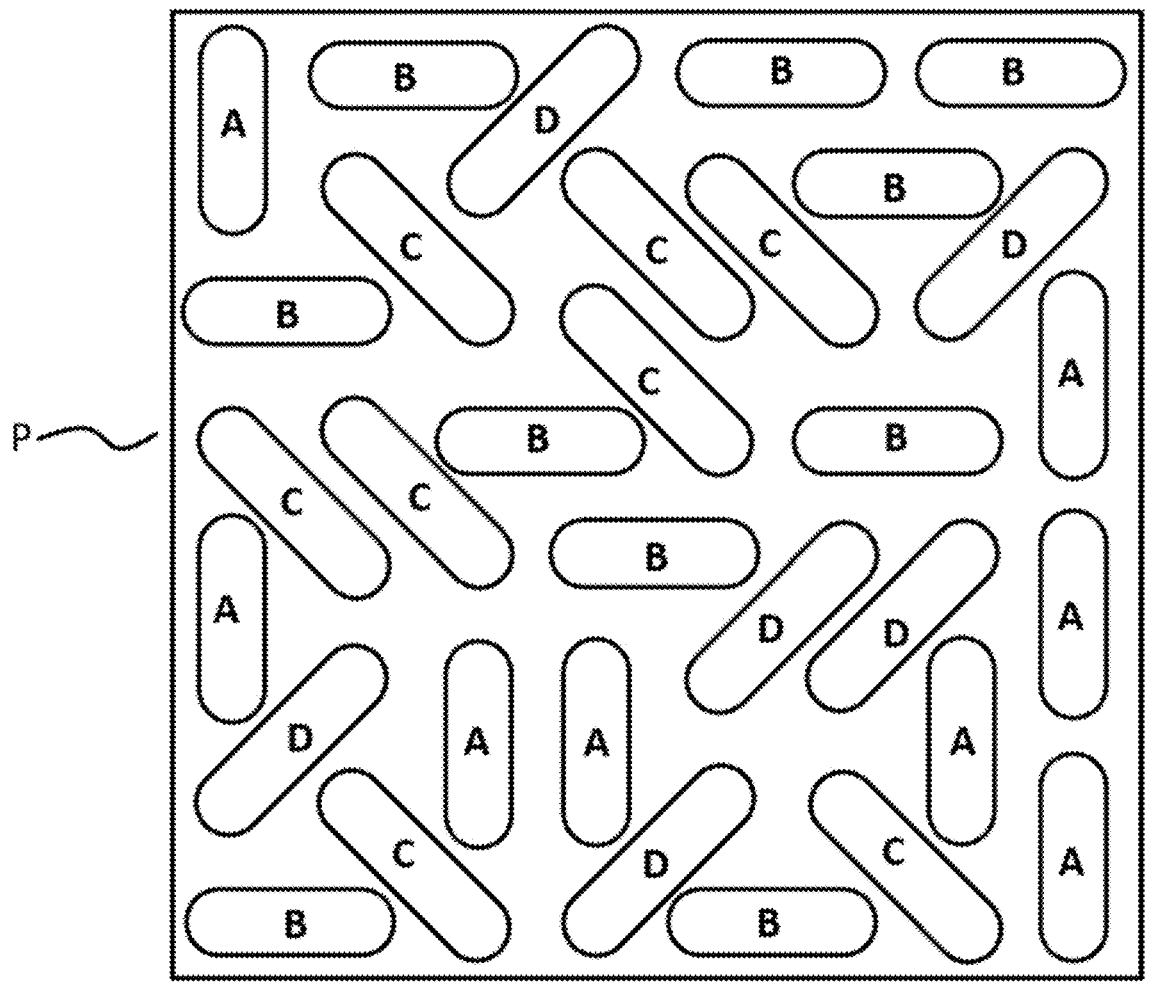
FIG. 1A illustrates an example of a known two-dimensional pattern P of a REP (Robust Encoding Pattern).
Figure 1B:
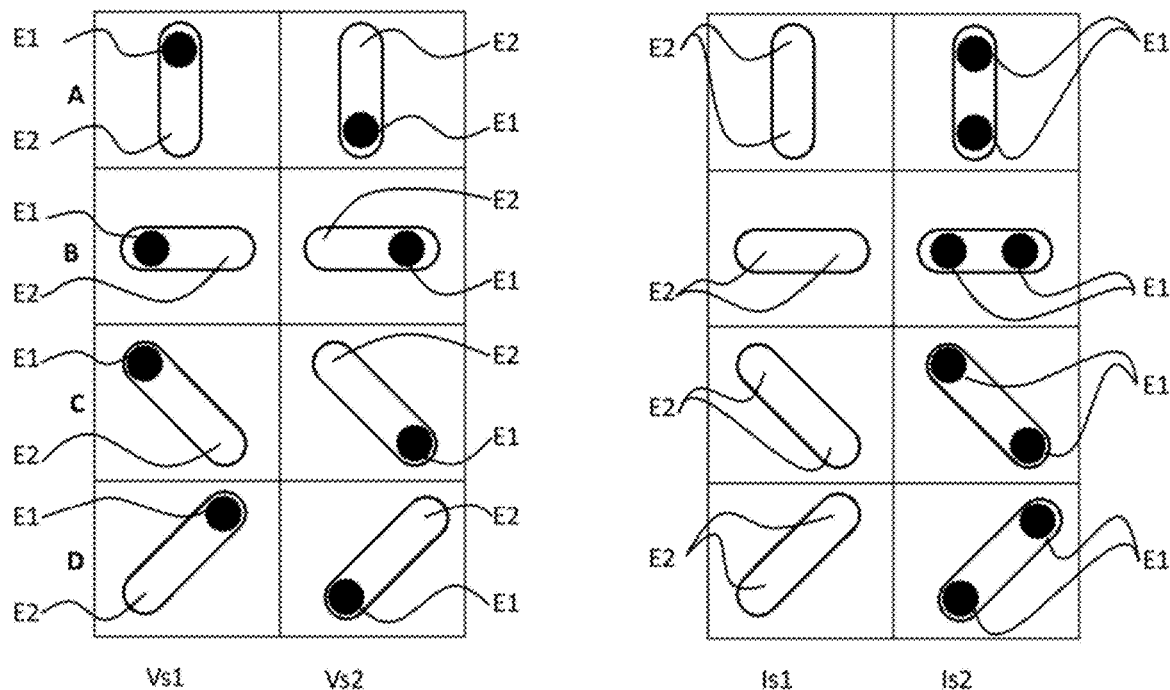
FIG. 1B illustrates an example of an alphabet of four symbols used for encoding data in the pattern P of FIG. 1A, with their two-dimensional elements, having each two valid states and two invalid states.
Figure 1C:
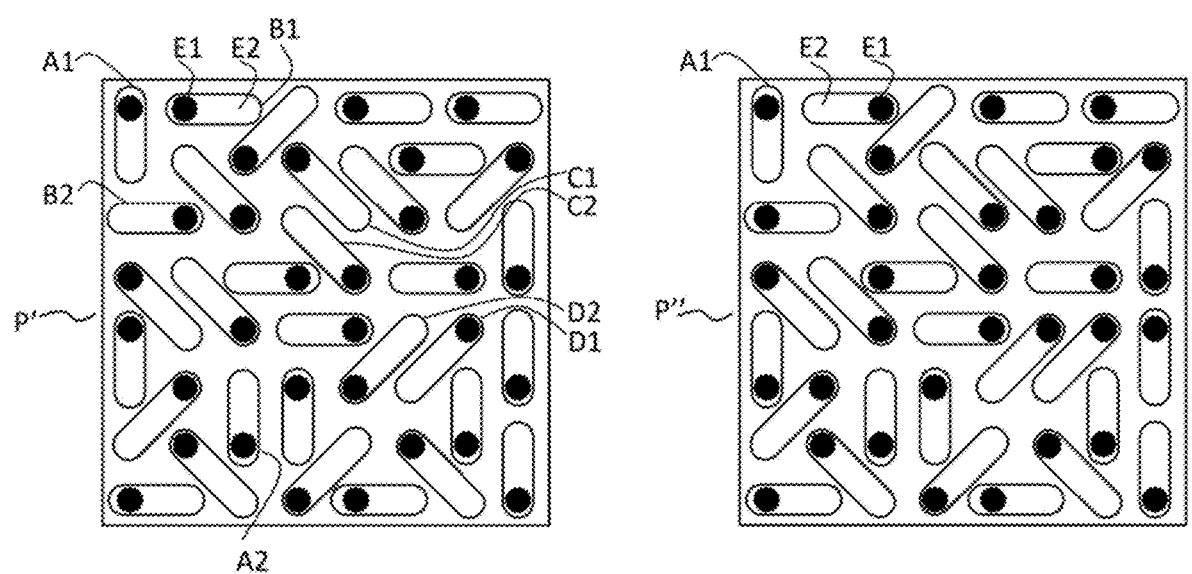
FIG. 1C illustrates an example of two distinct representations P' and P'' of the pattern P of FIG. 1A using valid states of the symbols shown on FIG. 1B.
Figure 2:
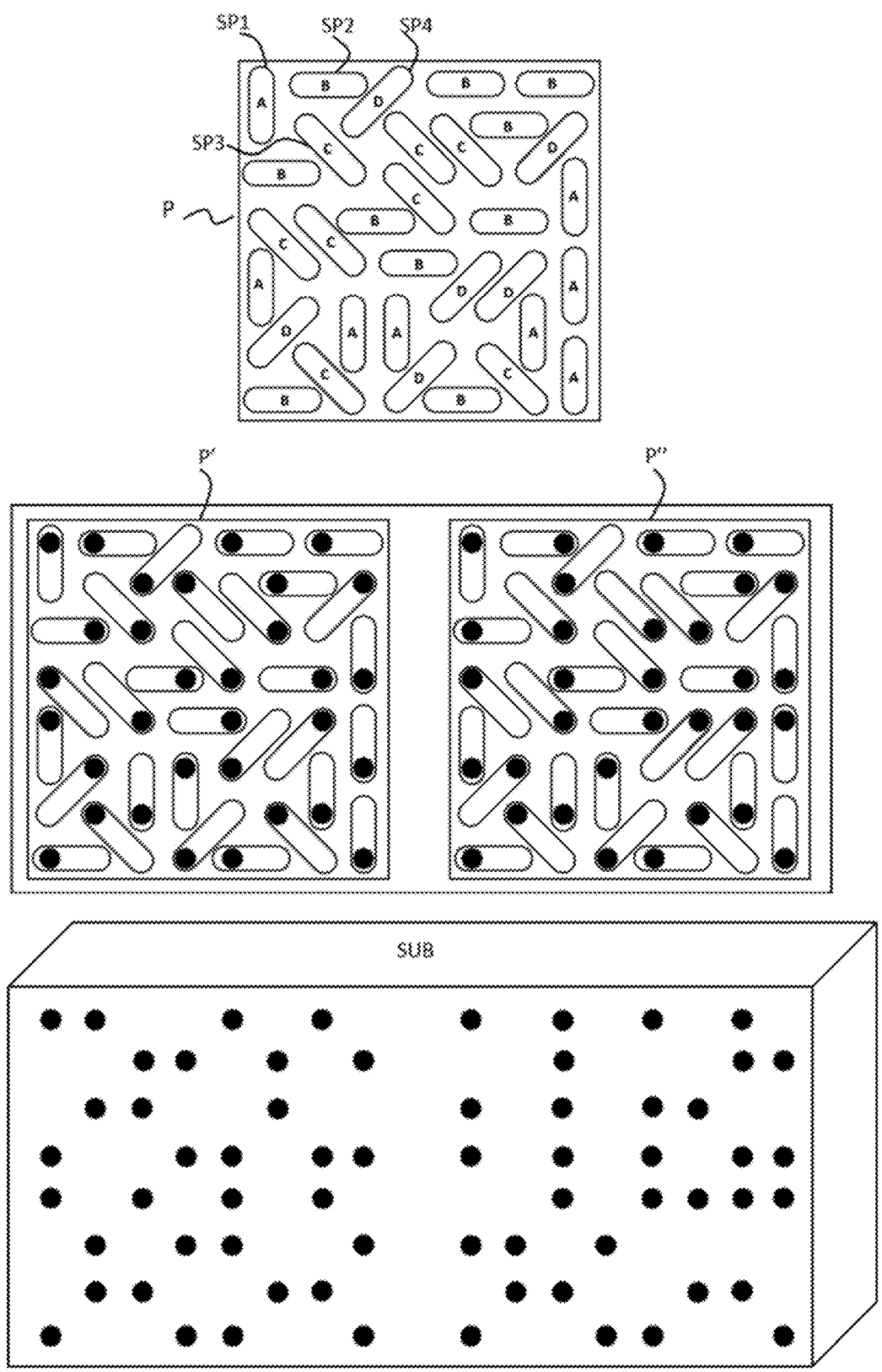
FIG. 2 illustrates an example of a marking of a substrate with the two two-dimensional patterns P' and P'' of FIG. 1C.
Figure 3A:
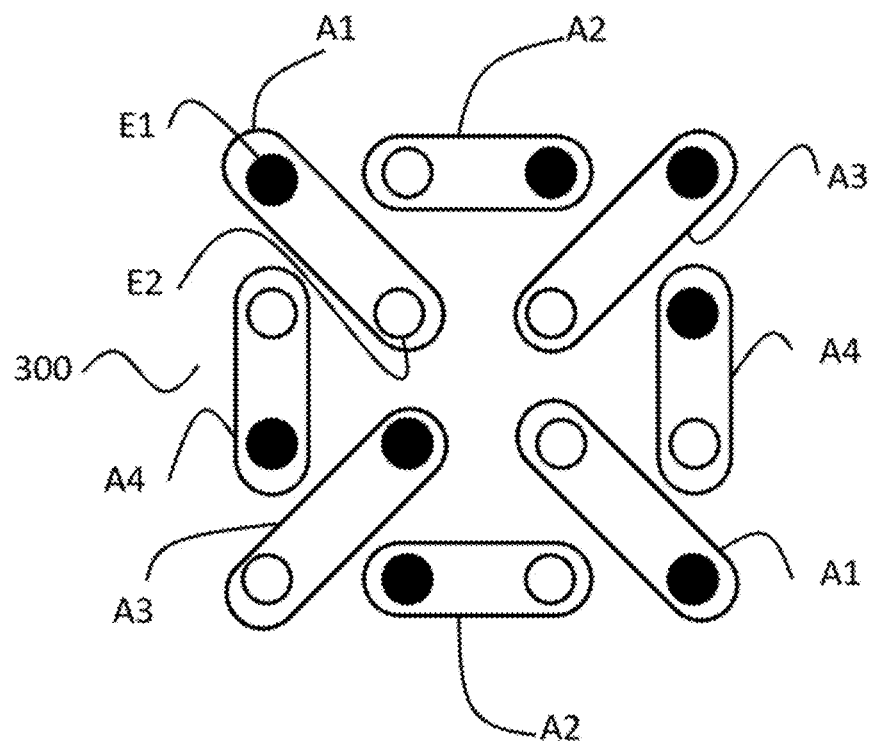
FIG. 3A shows an example of a two-dimensional reference pattern composed of 8 symbols, each having a pair of elements, disposed in a 4×4 matrix and corresponding to 1 byte of digital information.
Figure 3B:
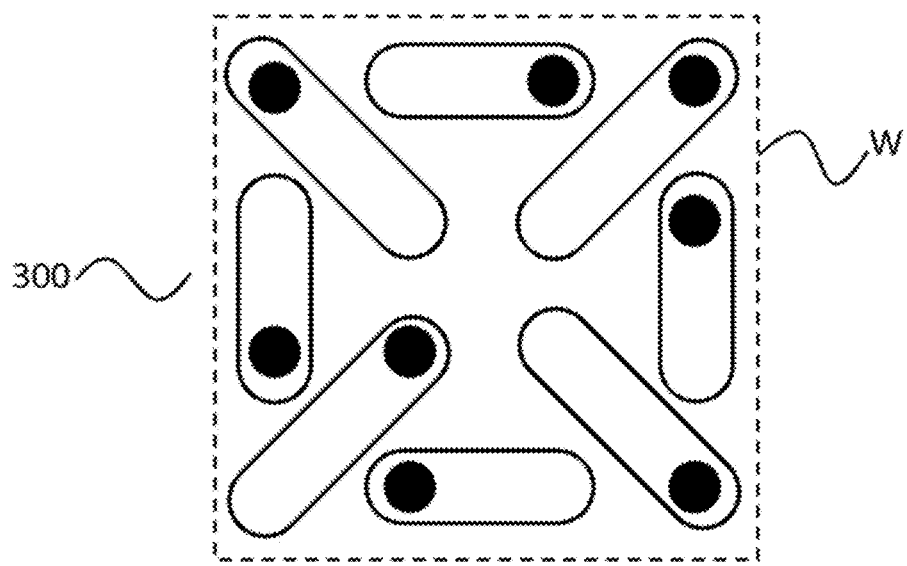
FIG. 3B shows the two-dimensional reference pattern of FIG. 3A wherein contours of the "white dots" elements are not marked, and with a dotted line showing a contour of a corresponding window.

As illustrated in the example below, the invention allows overcoming the above drawbacks. FIG. 3A illustrates an example of a two-dimensional pattern 300 (of REP type) composed of states of eight symbols obtained from representations of four (basic) symbols A1, A2, A3 and A4, each having a pair of elements (E1,E2), disposed in a 4×4 matrix and corresponding to 1 byte (i.e. 8 bits) of digital information. Here, each basic symbol appears twice in the two-dimensional 300: symbol A1 is shown in a first representation (top left corner) and a second distinct representation (bottom right corner); symbols A2 and A4, respectively, appear twice in 300 with respective first and second distinct representations; symbol A3 appears twice in 300, in only one representation (top right corner and bottom left corner). For better clarity, the boundaries of the sites delineated by the two-dimensional symbols are shown (as well as boundaries of the "white dots" of elements E2 having the relative higher parameter values in the symbols). However, such boundaries are not part of the reference pattern as applied on a surface (see e.g. FIG. 6B). In this example, the element E1 corresponds to a dot characterized by its black color (i.e. the lower parameter value p(E1) of the pair is associated with black color), and the element E2 corresponds to a dot characterized by its white color (i.e. the higher parameter value p(E2)>p(E1) corresponds to white). FIG. 3B shows the same two-dimensional pattern 300 without indication of the boundaries of the lighter dots (i.e. the "white dots" for the higher value of the pair), and also a window W, of which boundary is indicated with a dotted line, used to isolate the pixels of the image of the two-dimensional pattern 300 on a converted digital image.

Figure 4:
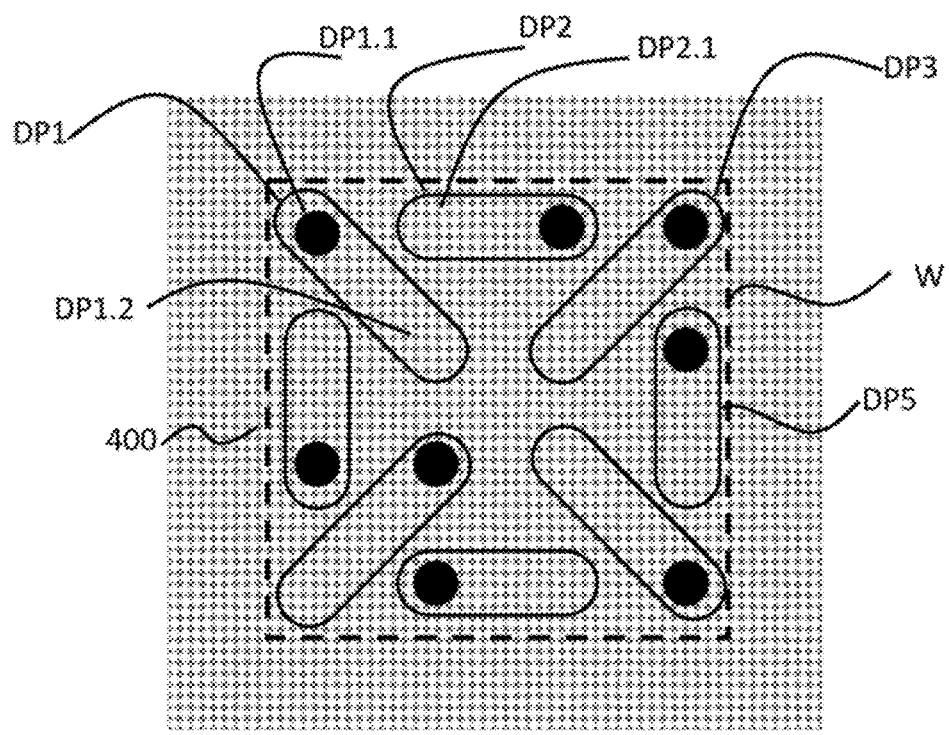
FIG. 4 shows the reference pattern of FIG. 3B on a non-uniform background.

FIG. 4 shows a two-dimensional pattern 400 which corresponds to the two-dimensional pattern 300 of FIG. 3B over a non-uniform background. The influence of the background is illustrated by the induced modification of the parameter values p(E1) and p(E2) of the respective elements forming a valid state of the symbols. The parameter value p(E1) still corresponds to "black", while the parameter value p(E2) is now more grey than white (still with p(E2)>p(E1)). However, what remains characteristic of a (valid) state of a symbol is that there is still a measurable difference between the parameter values of its elements, i.e. one, E1, appears darker than the other, E2, which thus appears lighter. In general, in case a symbol comprises more than two elements, a symbol state is characterized by the fact that there exists (at least) two distinct elements of the symbol of which parameter values have a measurable difference. Thus, a symbol comprises at least one pair of elements for which a "first element" E1 of the pair has a parameter value p(E1) being less than a parameter value p(E2) of a "second element" E2 of the pair: p(E1)<p(E2).

Figure 5:
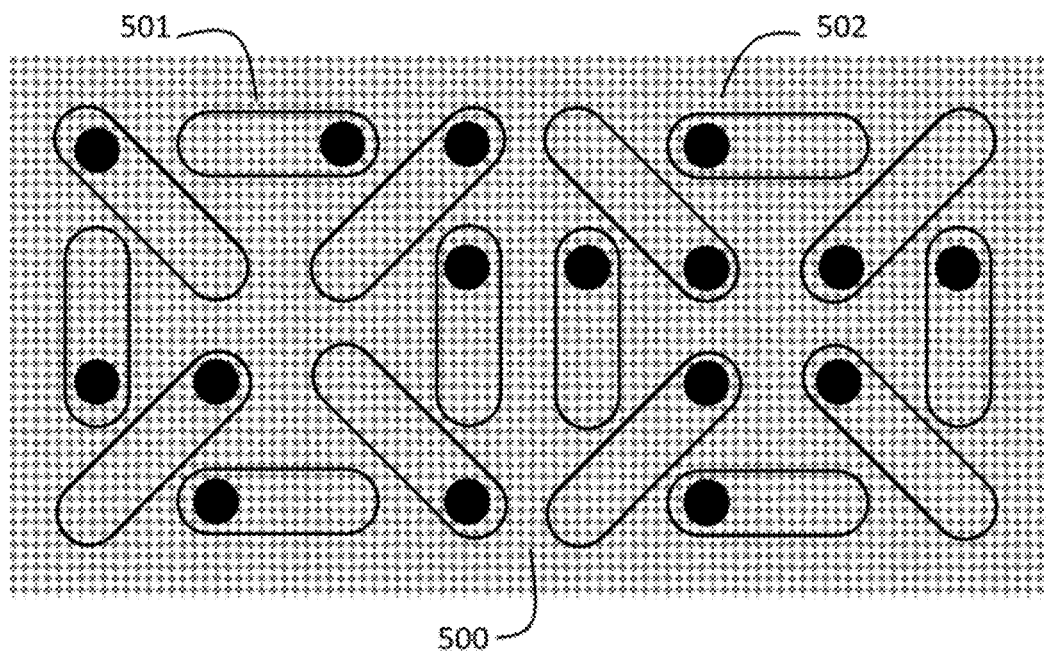
FIG. 5 shows a two-dimensional pattern comprising two contiguous two-dimensional reference patterns on a non-uniform background, a representation of one of the reference patterns corresponding to that of FIG. 4, as applied on a surface of a substrate.

FIG. 5 is an example of a two-dimensional pattern 500 comprising two contiguous two-dimensional reference patterns on a non-uniform background: the first reference pattern 501 corresponds to pattern 400 of FIG. 4, and the second reference pattern 502 corresponds to another (allowed) representation of the symbols of the reference pattern 501. For example, the representation of the symbols A1 in 502 are inverted with respect to that of symbols A1 in 501 (at respective same positions within the reference patterns).

Figure 6A:
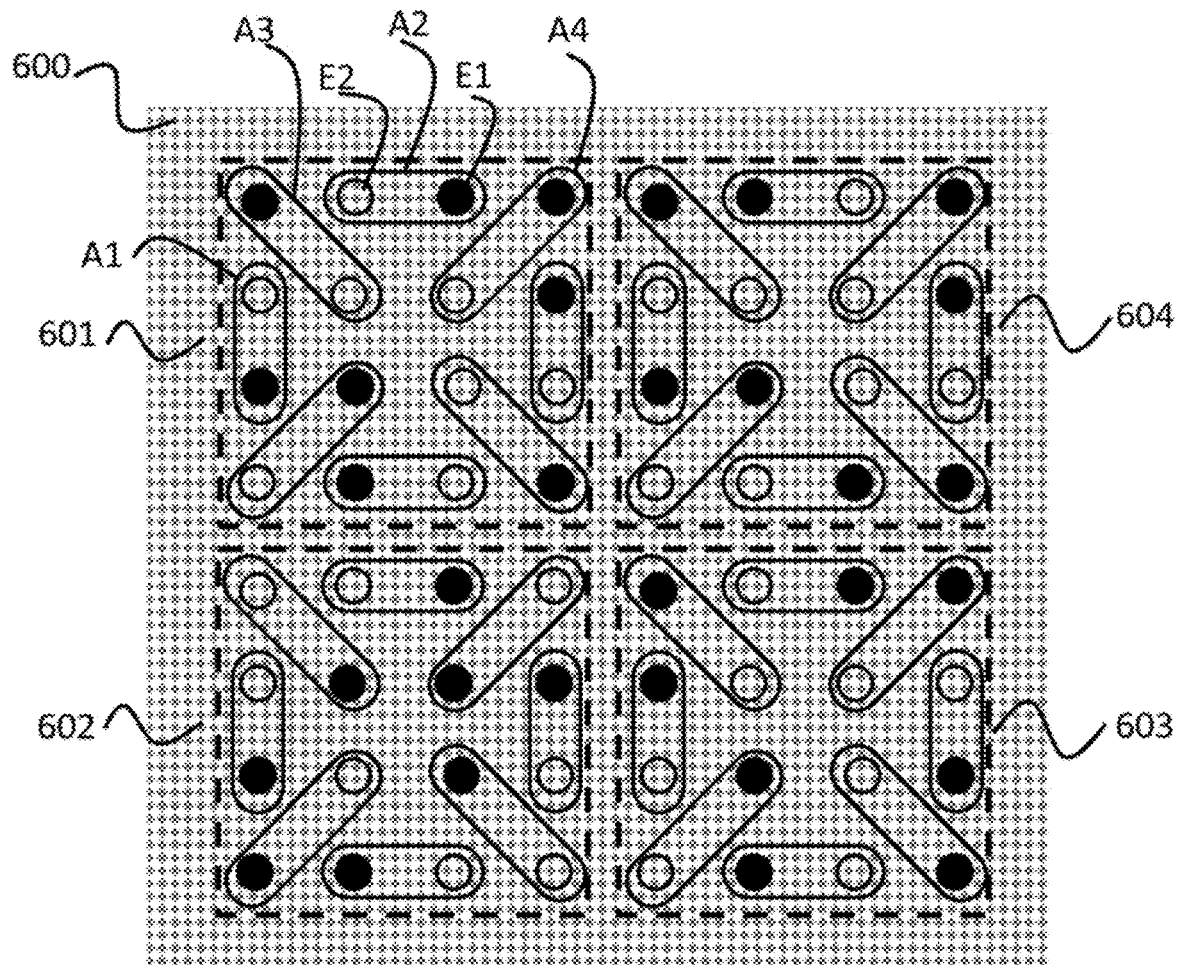
FIG. 6A shows a two-dimensional pattern (REP) comprising four contiguous two-dimensional reference patterns, with indication of the windows, the contours of the symbols and the elements of the symbols.
Figure 6B:
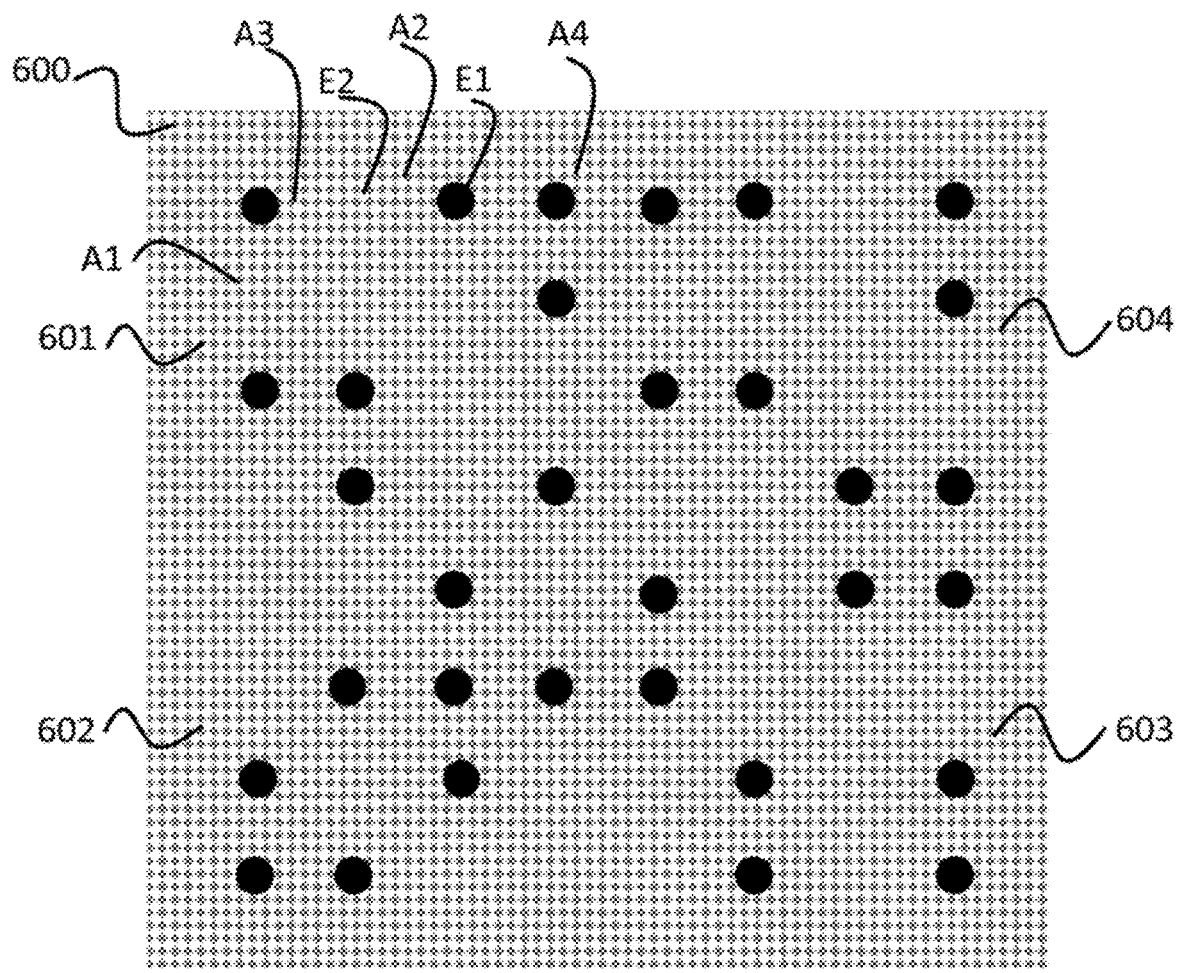
FIG. 6B shows a two-dimensional pattern of FIG. 6A as printed on a non-uniform background that can be decoded with a reader according to the invention.

FIG. 6A shows an example of a two-dimensional pattern 600 comprising four contiguous two-dimensional reference patterns 601-604 having each eight symbols (here, delineated by oval contours) corresponding to various representations of four (basic) symbols A1-A4 having each two elements (E1,E2), that can be decoded according to the invention. The respective contours of the windows used for detecting the four reference patterns are indicated with doted lines, and the shapes of the symbols and their elements are also marked only for a better visualization of the symbols. Generally, each of the reference patterns that can be included in a two-dimensional pattern (of REP type) to be decoded are known beforehand. More precisely, the symbols possibly present in any marked reference pattern, and their possible allowed arrangement(s) within any reference pattern are known. Also, the method of encoding data via the various representations of the symbols in a reference pattern is known, as well a corresponding decoding method. Nevertheless, for decoding a data content of a given reference pattern marked on a substrate, it is necessary to find the representations of the symbols, i.e. the symbols together with the relative parameter values of their two-dimensional elements, in order to obtain the states of these symbols (i.e. the layout of the elements of each symbol). The states of the symbols (i.e. their authorized representations) determine the encoding of data in each two-dimensional reference pattern and thus, in the whole two-dimensional pattern (REP) comprising these reference patterns. For decoding an encoded two-dimensional pattern of REP type marked on a non-uniform background, it is thus necessary to detect the symbols, and their states, for each reference pattern of the two-dimensional pattern. In case an unauthorized representation of a reference pattern is detected, it is an indication that the two-dimensional pattern including this reference pattern may not be genuine (see details in the above mentioned US patents U.S. Pat. No. 9,141,899 B2 or 9,224,028 B2). FIG. 6B shows the two-dimensional pattern 600 of FIG. 6A when printed on a non-uniform background of a surface of a substrate (e.g. a label) wherein, for simplicity and better visualization, all the elements E1 with relatively lower parameter values are represented with a same level of black color.

According to an embodiment of the reading and decoding method of the invention, as an initial step, a digital image of a two-dimensional pattern (of REP type) printed on a non-uniform background (e.g. the REP of FIG. 6B) is acquired by a camera (i.e. an imaging unit) of a scanner or a smartphone (i.e. a reader). The acquired digital image is represented according to multidimensional color space, here an RGB (Red, Green, Blue) color space, each pixel in the image has thus three color values that can be considered as constituting the three coordinates of an associated vector in a three-dimensional color space. Therefore, an RGB image corresponds to three two-dimensional arrays (i.e. Red, Green, and Blue 2-D arrays). In fact various multi-dimensional color spaces are known to fulfil the requirements of different applications such as the printing industry (e.g. CMYK), acquisition and display of images in electronic systems (e.g. RGB), or image analysis by taking the human perception of colors (e.g. HSV or CIELAB) into account.

The next step of the method consists in transforming the RGB color image into another, one-dimensional, color space. Depending on the colors that are present in the non-uniform background, several color conversions into distinct one-dimensional color spaces can be envisaged to enable a better discrimination of the states of the symbols of the two-dimensional pattern. In practice, the parameters of the two-dimensional elements have been selected so as to be detectable with respect to the background. The conversion of the pixel values of the acquired digital image into a one-dimensional color space is performed by mapping the values associated with each pixel of the acquired digital image to one corresponding value in said one-dimensional color space, and is performed via an image processing application running on a processing unit of the scanner or smartphone. This conversion in fact corresponds to a transformation of the components of vectors associated with the pixels into a scalar value on a specific one-dimensional color space.

There are many possibilities to realize such a conversion. The following four examples illustrates some of these possible conversion operations:

1) The RGB color image can be first converted into an HSB ("Hue, Saturation, and Brightness") three-dimensional color space, and only the hue component is retained as the scalar value (i.e. realizing a projection on the one-dimensional Hue color space). In the well-known HSB color space, the hue has its value typically ranging from 0 to 360 degrees. Hue is measured in degrees, like degrees of a circle because hue indicates a color on the color wheel (A color wheel or color circle is an abstract illustrative organization of color hues around a circle, which shows the relationships between primary colors, secondary colors, tertiary colors etc.). For example, Red corresponds to 0°, Green to 120°, Blue to 240° (and Red is also 360°, which is the exact same as 0°). "Saturation" is a number between 0 and 100: no matter what hue value is considered, a saturation of 100% will be the richest possible version of that color and a saturation of 0% will be the gray version of that color (i.e. if the color is light, it'll be a light gray; if the color is dark, it'll be a dark gray). "Brightness" is a number between 0 and 100. Like saturation, brightness is sometimes written as a percentage: 0% brightness is black (no matter the hue, no matter the saturation), and 100% brightness is white only if saturation is also 0% (otherwise, 100% brightness is just a . . . very bright color).

2) An example of a projection particularly adapted to the reading of caps having a logo (non-uniform background) with dominant magenta color. The acquired RGB color image can be first converted into an HSB three-dimensional color space (for shifting the hue component to correspond to a dark magenta component), and the obtained HSB digital image is converted into a CMYK color space (Cyan, Magenta, Yellow, and Key (i.e. black)), and only the M (i.e. Magenta) component is retained as the scalar value (i.e. realizing a projection on the one-dimensional "Magenta color space").

3) The acquired RGB color image can be first converted into a HSB three-dimensional color space, and, knowing the HSB values of the (reference) ink used for marking the two-dimensional pattern on the non-uniform background, an (Euclidean) distance between the these ink HSB values and the HSB values of the pixels of the two-dimensional pattern can then be calculated and used as scalar values associated with the pixels: thus, said distance realizes the projection of the initial RGB color image onto a one-dimensional color space.

4) The acquired RGB color image can also be first converted into a CIELAB three-dimensional color space, and, knowing the CIELAB (or "Lab") values of the (reference) ink used for marking the two-dimensional pattern on the non-uniform background, an (Euclidean) distance between the these ink CIELAB values and the CIELAB values of the pixels of the two-dimensional pattern (REP) can then be calculated and used as scalar values associated with the pixels: thus, the Euclidean distance realizes the projection of the initial RGB color image onto a one-dimensional color space. The CIELAB color space is a color space defined by the International Commission on Illumination (CIE) in 1976. Color is expressed by means of three values (coordinates): coordinate L* for the lightness from black (having the value 0) to white (having the value 100), coordinate a* from green (−) to red (+), and coordinate b* from blue (−) to yellow (+). CIELAB was designed so that the same amount of numerical change in these values corresponds to roughly the same amount of visually perceived change. The CIELAB space is thus a three-dimensional space. This space is usually mapped onto a three-dimensional integer space for digital representation, and thus the L*, a*, and b* values are usually absolute, with a pre-defined range. The lightness value, L*, represents the darkest black at L*=0, and the brightest white at L*=100. The color channels, a* and b*, represent true neutral gray values at a*=0 and b*=0. The a* axis represents the green-red component, with green in the negative direction and red in the positive direction. The b* axis represents the blue-yellow component, with blue in the negative direction and yellow in the positive direction.

The transformation involved for the conversion of the acquired digital image into the one-dimensional color space can be global (as above), i.e. by applying the same rule uniformly for all the pixels of the acquired digital image of the two-dimensional pattern: for example, in case a pixel $p_i$ of the acquired digital image has values in a RGB three-dimensional color space $(a_i, b_i, c_i)$, then a set of coefficients $(\alpha, \beta, \gamma)$ representing the percentages of the respective RGB values that are combined to perform a projection of the vector $(a_i, b_i, c_i)$ (i.e. to obtain the associated projection value in a one-dimensional space) is used to calculate the scalar value $sv_i$ corresponding to the pixel $p_i$ with $sv_i = \alpha a_i + \beta b_i + \gamma c_i$ (with the normalization $(\alpha+\beta+\gamma)=1$). However, many other choices can be used, for example, it is possible that the values of the above coefficients in fact depend on the location of the pixels in the digital image so as to somewhat compensate local effects of the background (e.g. if the background logo is known) on the parameter values of the elements of a corresponding local symbol of the two-dimensional pattern (to make easier a detection of a difference between these parameter values). Also, the coefficients can depend on the values of the coordinates $a_i$, $b_i$, $c_i$ etc. . . . .

After the transformation step of the pixel values into a one-dimensional color space, a converted digital image results, wherein each pixel has one associated corresponding scalar value (i.e. its coordinate in the one-dimensional color space), which is stored in a memory of the reader.

For the next step of the method, in order to overcome the weakness of the existing thresholding methods (i.e. global threshold) for detecting a data matrix symbol, the invention relies on the a-priori knowledge of the geometrical arrangement of the symbols in the allowed reference pattern(s), and a priori knowledge of the authorized representations of these reference pattern(s) used for encoding data (and, of course, also how to decode data encoded in such reference patterns). According to the invention, the obtained converted digital image of the two-dimensional pattern is processed (i.e. scanned via the programmed image processing application running on the processing unit of the reader), so as to isolate a block of pixels of a size corresponding to that of an image of a reference pattern of said two-dimensional pattern, and detect the representation of the symbols of the reference pattern by determining their respective states from the pixel values measured within said block of pixels. Once the detection of the states of the symbols of a block of pixel has been performed and the result saved in the memory, the converted digital image is further processed to isolate another block of pixels corresponding to an image of another reference pattern of the two-dimensional pattern (e.g. a reference pattern contiguous to the previous one), and the symbols and their respective states of this another reference pattern are then determined, and so on until the two-dimensional pattern is completely analyzed. According to the invention, an undetermined state of one symbol alone preferably cannot decide for the validity or the invalidity of the whole reference pattern containing said symbol. Validity or invalidity of a reference pattern, for a given converted digital image, is decided based on conformity of each detected state of a symbol with detected states of at least neighboring symbols in the reference pattern (possibly, with all the detected states of the symbols of the reference pattern) with respect to the (known) allowed possible representations of the reference pattern. Such a conformity is necessary to decide that a one-to-one mapping exists between a representation of the states of an arrangement of symbols, as detected from measured pixel values in a block of pixels delineated by a window, and a known allowed representation of a reference pattern.

In practice, the above image processing amounts to using a "mobile window", or "sliding window", having the (known) size of an area corresponding to that of a reference pattern on the converted digital image for analyzing the converted digital image and isolating a corresponding block of pixels from the remaining pixels. After having detected the states of the symbols from measurement of pixel values within the isolated block of pixels, the window is then "moved" so as to successively explore all the blocks of pixels of the different reference patterns present on the converted digital image of the two-dimensional pattern. In order to have a robust and reliable detection method, a test reference pattern is first selected amongst a (known) set of allowed reference patterns. The geometrical arrangement of the symbols within this selected test reference pattern is known: only their two-dimensional locations within the test reference pattern matters here, not their specific state representations (although the allowed representations are also known). In fact, it is the a priori knowledge of the various locations and shapes (e.g. as delineated by oval contours on FIG. 7A for illustration) of the areas occupied by the symbols of the test reference pattern that is first used by the method. The test reference pattern is indeed used as a mask (within the above mentioned window) having holes corresponding to the shapes and locations of its symbols, and a state of each symbol of the test reference pattern is determined from detected parameter values of its elements resulting from measured pixel values of the pixels (of the block of pixels in the window) that are located within the hole corresponding to the symbol. According to the invention, using a mobile window to explore various blocks of pixels of a converted digital image of a two-dimensional pattern comprising two-dimensional symbols and their (two-dimensional) elements (e.g. of the REP type) has the further advantage of making unnecessary the use of a specific mark pattern for finding, and delineating a contour of the two-dimensional pattern (by contrast with conventional 2D barcodes). Indeed, as a preliminary step to find a region of the two-dimensional pattern within the image, it is sufficient to detect the respective positions (on a grid) of a plurality of elements in an area of the converted digital image roughly containing the two-dimensional pattern, for example those corresponding to "black dots" (i.e. one type of elements), applying a combination of conventional morphological filters (e.g. erosion and dilation) to localize the region corresponding to the 2D pattern, and finally determine a surrounding contour for the detected cloud of elements by known image processing techniques (the more elements are located the better it is), e.g. as disclosed in Rafael C. Gonzalez and Richard E. Woods, "Digital Image Processing", third Edition (2008), Pearson Prentice Hall, see chapter 9, pages 628-679, and determining an orientation by calculating an axis of symmetry of the cloud (for example, via conventional edge detection and use of polygonal approximation of the contour surrounding the dots followed by a computation of axis of symmetry). Moreover, if a typical shape of the two-dimensional pattern is known beforehand (the most common case), a scalable contour can be adjusted to the set of detected black dots and a precise position and orientation of the two-dimensional pattern can be calculated (this can be carried out via conventional template matching techniques). As a result of the preliminary determination of the location of the two-dimensional pattern, the window W can be first positioned over any part of the two-dimensional pattern on the converted digital image and a corresponding isolated block of pixels is then analyzed to detect parameter values of elements, through respective holes of a selected mask superimposed on the window area, at locations within the window corresponding said holes, said holes respectively corresponding (in location) to the symbols of a corresponding selected test reference pattern. Then, image processing operations on the isolated block of pixels (not necessarily corresponding to one reference pattern) are performed to determine whether there is a one-to-one mapping between an allowed representation of the selected test reference pattern (wherein each state of each symbol is known beforehand) and a representation of the selected test reference pattern resulting from the detection within the block of pixels, through the mask corresponding to the test reference pattern, of the parameter values of respective elements of the symbols of the test reference pattern. It is first guessed that such a mapping exists between the respective symbols of the selected test reference pattern and the symbols (corresponding in location) within an area delineated by the window on the converted digital image:

1) if a one-to-one mapping indeed exists, then a representation of (the states of) the symbols of the test reference pattern, wherein a state of each symbol of the test reference pattern is determined by analyzing the pixel values at corresponding location (detected through corresponding hole of the mask) in the isolated block of pixels and measuring corresponding parameter values of elements of the symbol at this location, will correspond to an authorized representation of this test reference pattern (the measured parameter values of the elements resulting from the pixel values measured at the corresponding locations of said elements in each symbol of the test reference pattern will enable determining for each symbol the values $p(E1)$ and $p(E2)$ of a pair of elements, with $p(E1)<p(E2)$). In this case, the block of pixels in fact corresponds to the pixels of a reference pattern of the two-dimensional pattern, and a representation of (the respective symbols of) this reference pattern corresponds (via the mapping) with a representation of the (respectively corresponding symbols of) the selected test reference pattern. As a result, a data content of the reference pattern can be decoded (after a validation step of the existence of the mapping). Then, the window is moved by at least one pixel size to delineate a new block of pixels on the converted digital image of the two-dimensional pattern and perform the above image processing operations to look for a possible one-to-one mapping with a representation of the test reference pattern. Moving the window e.g. by one pixel size makes the detection of said one-to-one mapping very robust and reliable, as no reference pattern can be missed when moving the window to explore the area occupied by the two-dimensional pattern on the converted digital image.

2) if instead, there is no possible one-to-one mapping between a representation of the symbols detected, through the mask formed by the selected test reference pattern, from the block of pixels delineated by the window and a known representation of the symbols of said selected test reference pattern, the window is moved by at least one pixel size to delineate a new block of pixels on the converted digital image of the two-dimensional pattern and perform the above image processing operations to look for a possible one-to-one mapping with a representation of the test reference pattern. Alternatively (in an equivalent manner), the window is not moved but a new selected test reference pattern (from the set of allowed reference patterns) is used as a new mask for looking for a one-to-one mapping with the representation as detected through this new mask on the block of pixels and a known representation of the new test reference pattern. This later operation can be repeated until all the allowed test reference patterns are tested and, if there is still no one-to-one mapping, the window is moved (by at least one pixel size) over the two-dimensional pattern to isolate a new block of pixels and a test reference pattern is selected to check whether a one-to-one mapping is possible with an allowed representation of this test reference pattern.

The above operations for checking if a mapping exists between a selected test reference pattern and states of its symbols obtained from a block of pixels within the moving window are repeated until all the pixels of the converted digital image are explored. Each time a one-to-one mapping is found between the symbols of a test reference pattern and those of a corresponding block of pixels on the converted digital image, the detected representation of the corresponding reference pattern is stored in a memory (and possibly decoded, based on known correspondence between a state of a symbol and its data content), and finally the whole two-dimensional pattern on the converted digital image is explored (and possibly at least partially decoded). A full decoding of the two-dimensional pattern, i.e. of all of its reference patterns, often requires analyzing the two-dimensional pattern through several distinct one-dimensional color spaces (i.e. through distinct converted digital images obtained from the acquired digital image of the 2D pattern), as some representations of the test reference patterns may be considered as invalid whatever block of pixels is selected for a given converted digital image. This is particularly the case when the non-uniform background is strongly modulated.

An example of a practical implementation of the reading and decoding method is detailed below in relation with a two-dimensional test reference patterns TP illustrated on FIG. 7A, and a two-dimensional pattern 700 comprising only two distinct (allowed) representations P1 and P2 of TP illustrated on FIG. 7B. The test reference pattern TP on FIG. 7A in fact corresponds to the reference pattern 400 of FIG. 4, except that only the locations and shapes (delineated by oval contours for better clarity) of the areas occupied by the eight symbols of the test reference pattern 400 are shown, i.e. without the white or black dots indicating their respective elements (E1,E2). The two-dimensional pattern 700 of FIG. 7B is thus composed of the two distinct reference patterns P1 and P2. P1 is in fact an allowed representation (on a non-uniform background) of the test reference pattern TP wherein the states of the symbols of TP are shown and correspond to the representation of the reference pattern 400 of FIG. 4, and P2 is a distinct allowed representation of the test reference pattern TP wherein the states of the symbols of TP are also shown. Once printed on the non-uniform background of a surface of a substrate, the two representations of the two reference patterns P1 and P2 of the two-dimensional pattern 700 of FIG. 7B have the look 710 shown on FIG. 7C. The dotted lines shown on FIG. 7B symbolizes the contour of the window W used for isolating a block of pixels corresponding to a reference pattern P1 or P2 of this two-dimensional pattern. In this example, for simplicity, we will not repeat all the intermediate steps of moving the window W pixel by pixel in order to detect a representation of a reference pattern (as explained above), and we suppose directly that the window W delineates a block of pixels corresponding to a reference pattern of the two-dimensional pattern, or is moved directly (thus, by a number of pixels corresponding to the size of a reference pattern) to a next block of pixels corresponding to a next reference pattern. However, the intermediate step by step motion of the window (and corresponding checking for a one-to-one mapping) is in fact implicit in what follows.

Figure 7A:
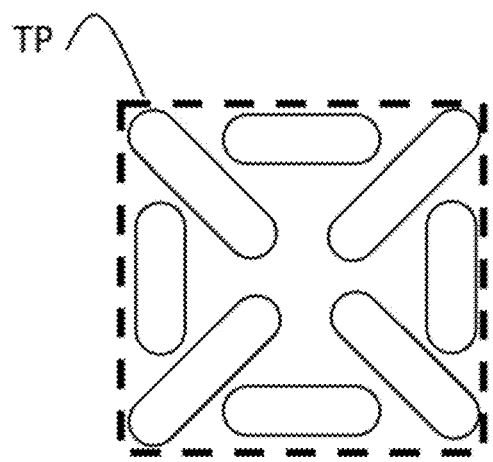
FIG. 7A-E show examples of a first test reference patterns (7A), a two-dimensional pattern (7B) containing two reference patterns P1 and P2, the two-dimensional pattern of FIG. 7B as printed on a non-uniform background (7C), a second test reference pattern TP'(7D) and an allowed representation of TP'(7E).
Figure 7B:
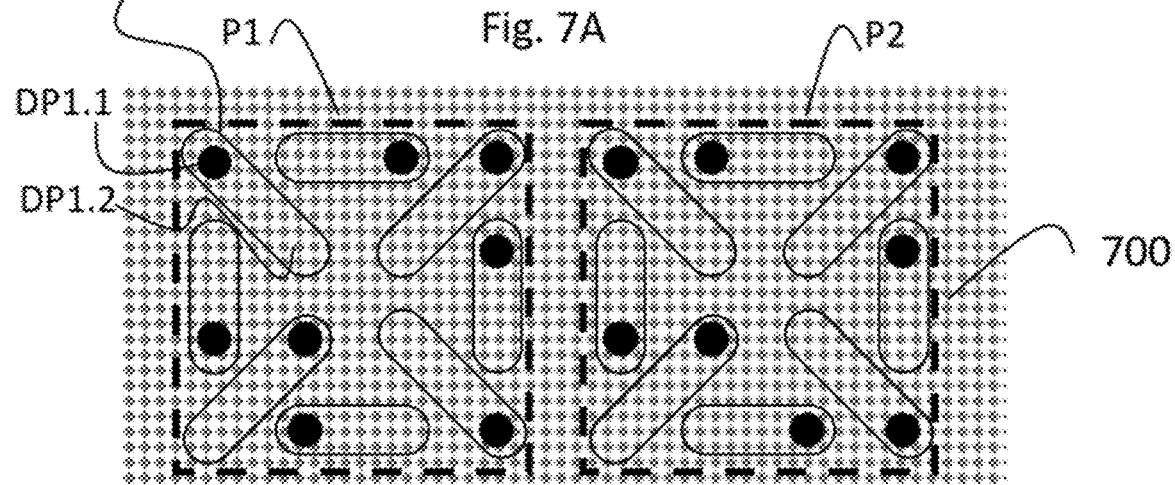

When "superposing" the window W (having the same size than that of the reference patterns P1 and P2 on the converted digital image) together with a detection "mask" corresponding to the selected test reference pattern TP of FIG. 7A through which the parameter values of the elements within the window are measured, it is assumed that, for example, the image region DP1 corresponds to the first symbol on top left corner of TP (see also FIG. 4). Here, the detected pixel values (through the window W, via image processing) of the sub-region DP1.1 of DP1 are smaller (i.e. appear darker) than the pixel values of sub-region DP1.2 of DP1, i.e. the difference between a value of the pixels characterizing the element at DP1.1 and a value of the pixels characterizing the element at DP1.2 is negative: then DP1.1 is classified as corresponding to the parameter value p(E1) characterizing the darker element, or first element, E1 ("black" dot) and DP1.2 is categorized as corresponding to the parameter value p(E2) characterizing the lighter element, or second element, E2 ("white" dot) of said first symbol of TP, as we have p(E1)<p(E2). Thus, a representation of a state of the first symbol is obtained, with p(E1)<p(E2) (see also the corresponding state shown on FIG. 4 for this symbol). Each time a representation of a state of a symbol of TP is detected from pixel values of the converted digital image, an indication that the corresponding detected parameter values are assigned to the elements of this symbol is stored in the memory.

The parameter value of an element can be obtained through, for example, a Gaussian or average filtering of the pixels corresponding to this (two-dimensional) element, with the size of the kernel adjusted to that of the element. Unlike the existing thresholding methods, no global threshold is used here for the classification of an element. This method is thus local and only based on the relative values of element parameters, i.e. based on a detected difference of said parameter values to find the "darker" and the "lighter" elements, and thus is much more robust with respect to noise than other methods based on thresholding.

The operations of detecting a symbol state through the window are performed in the same way for the other symbols of the test reference pattern TP, by measuring the parameter values of elements of the corresponding blocks of pixels of the reference pattern of the converted digital image and determining (by difference) the first (darker) element E1 and the second (lighter) element E2 (i.e. with p(E1)<p(E2)).

For a given position of the window above the converted digital image (i.e. for a given block of pixels relating to a reference pattern of the two-dimensional pattern) and a given test reference pattern (mask), the corresponding detected states assigned to the symbols of this test reference pattern to form a candidate representation for the test reference pattern are then used to determine whether a one-to-one mapping (taking into account positions of the symbols) is possible between these detected states, i.e. the corresponding candidate representation, and the states of corresponding symbols of a known (allowed) representation of the test reference pattern. A candidate representation of the test reference pattern indeed corresponds to a specific representation of its symbols, wherein the states of the symbols are specified from measured pixel values (measured through the mask). Indeed, it is necessary to check whether there is a global matching between all the (separately) detected states for the respectively corresponding symbols of the selected test reference pattern and the states of corresponding symbols of an allowed global representation of said test reference pattern, i.e. whether there exists a known allowed representation (as a whole) of the symbols of the test reference pattern for which it is possible to find a one-to-one mapping between each one of the detected states for symbols of the test reference pattern constituting a candidate representation and corresponding states of symbols (with same locations in the pattern) of said allowed representation. In case all the detected symbol states of the candidate representation correspond to a same (allowed) representation of corresponding symbols of the test reference pattern, i.e. if the detected symbol states are consistent with the representation of the test reference pattern so that for each symbol p(E1)<p(E2), then the candidate representation is a valid representation of the test reference pattern: the corresponding reference pattern of the converted digital image is considered as read and its representation is that of the valid candidate representation of the test reference pattern.

Thus, the local detection of the states of the symbols of TP in fact comprises determining, for each symbol of the test reference pattern, a state of the symbol by detecting through the window the respective parameter values of an arrangement of elements at a location on the converted digital image corresponding to that of said symbol in the test reference pattern, and by respectively assigning the detected parameter values p(E1) and p(E2) to corresponding elements (E1, E2) within the symbol, storing in the memory the assigned parameter values of its respective elements, the symbol having thus an assigned state comprising a pair of elements (E1, E2) wherein a first element E1 of the pair has an assigned parameter value p(E1) less than an assigned parameter value p(E2) of a second element E2 of the pair.

According to the invention, in order to check the existence of a one-to-one mapping with an authorized representation, the validation of a candidate representation P1 (resp. P2) of the test reference pattern TP obtained by assigning to each symbol of TP a state given by the corresponding stored assigned parameter values of its respective elements, is carried out by checking that the parameter value p(E1) of each first element E1 of any symbol of the candidate representation is less than the respective parameter values p(E2) of the second elements E2 of neighboring symbols (and further checking that this candidate representation is an allowed representation for the test reference pattern TP, in case not all the possible representations of TP are in fact allowed for encoding data). This allows to verify that a "black" dot in one symbol would also be considered as being a black dot with respect to any "white" dot of the other symbols (at least around said one symbol). This operation of validation of the candidate representation P1 (resp.P2) of the test reference pattern TP in fact constitutes a test of the above mentioned conformity of each detected state of a symbol with detected states of neighboring symbols, and is necessary to decide that a one-to-one mapping indeed exists between the candidate representation P1 of the states of the arrangement of symbols of the mask TP, as detected from measured pixel values in the block of pixels delineated by the window W through said mask, and a known (allowed for encoding data) representation of the test reference pattern TP. Then, in case the candidate representation of the test reference pattern TP constitutes a valid representation of the test pattern, storing in the memory an indication that the reference pattern P1 (resp. P2) on the converted digital image has a validated representation corresponding to said valid representation of the test reference pattern, shifting the window at a position corresponding to another reference pattern P2 (resp. P1) on the converted digital image, and performing the above steps with said another reference pattern P2 in place of the reference pattern P1; or in case the candidate representation of the test reference pattern does not constitute a valid representation of the test reference pattern, performing said above steps with another test reference pattern, selected among the remaining allowed reference patterns stored in the memory, in place of the test reference pattern TP (in this example, we have only one test reference pattern).

The operation of checking that the parameter value p(E1) of each first element E1 of any symbol S of the candidate representation is less than the respective parameter values p(E2) of the second elements E2 of the neighboring symbols may be performed via many different ways. For example, only the symbols within the window W and being the closest to the symbol S under consideration can be retained for neighboring symbols. In another example, only the symbols within the window W and located within a given distance d around the symbol S under consideration can be retained for the neighboring symbols. It is also possible to consider neighboring symbols which are not only within the window but may belong to a contiguous reference pattern et. As the parameter values p(E) of each element are known for a candidate representation of a test reference pattern, it is possible, for example, to find in this representation a first element E1 of a symbol having the highest parameter value $p(E1)_{high}$ with respect to the other neighboring symbols and a second element E2 of a symbol having the lowest parameter value $p(E2)_{low}$ with respect to the other neighboring symbols: then the candidate representation is valid only if $p(E1)_{high} < p(E2)_{low}$. In order to increase the level of reliability of the validation, it is possible to consider not only neighboring symbols of a given symbol but all the other symbols of the candidate representation.

Figure 7C:
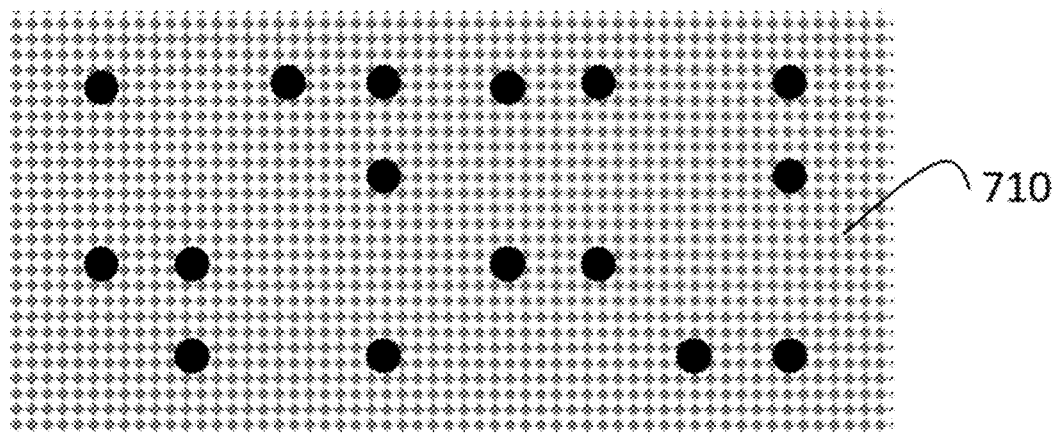
Figure 7D:
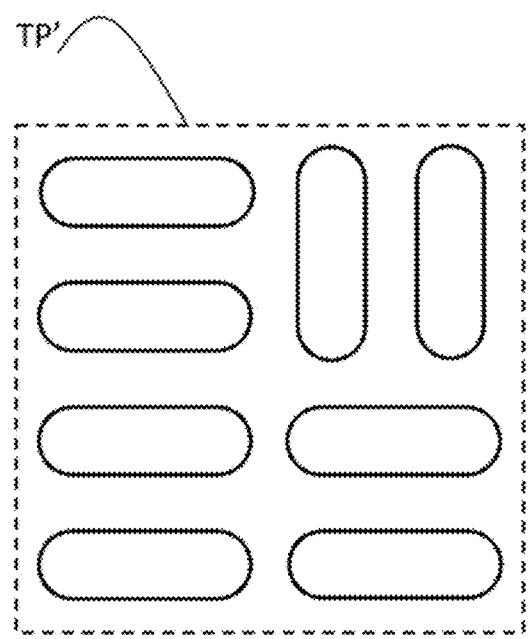
Figure 7E:
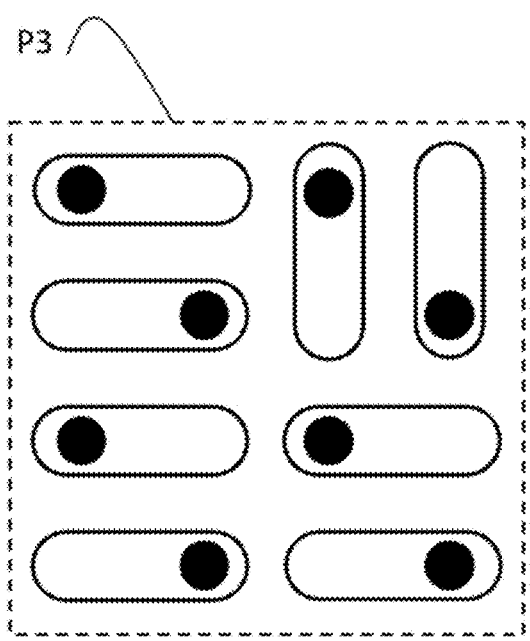

Here, the above image processing performed for the symbols of the first reference pattern P1 (as delineated with a dotted line) of a converted digital image of the two-dimensional pattern 710 of FIG. 7C, using the detection "mask" corresponding to the test reference pattern TP of FIG. 7A, reveals a one-to-one mapping between TP and the (allowed) representation of the reference pattern P1 of FIG. 7B. Clearly, using the test reference pattern TP' of FIG. 7D as a mask instead of TP cannot lead to any one-to-one mapping with P1, as the allowed representation P3 (FIG. 7E) of TP' cannot match (for any symbol) with the representation P1. It is also clear with the new position of the window W over P2 that a one-to-one mapping can be also found between the mask TP and this second reference pattern P2 (as P2 indeed corresponds to an allowed representation of TP). By contrast, such a one-to-one mapping with the representation P2 cannot be found if the test reference pattern TP' is used as a mask instead of TP (as in fact the allowed representation P3 of TP' cannot match with P2). Conversely, if the second reference pattern P2 of the two-dimensional pattern 700 were replaced with the reference pattern P3, then the next test reference pattern TP' should be used instead of TP in order to detect a one-to-one mapping. The above image processing of the converted digital image of the two-dimensional pattern 710 finally reveals a one-to-one mapping between TP and the allowed reference patterns P1 and P2. Consequently, as the states of the symbols of the first and second reference patterns of the converted digital image of the two-dimensional pattern 710 have been obtained, this two-dimensional pattern can be decoded and its data content extracted. When all the states of the symbols of each of the reference patterns on the converted digital image of the two-dimensional pattern are found, it is possible to decode the two-dimensional pattern and extract the corresponding information. However, a two-dimensional pattern of a Robust Encoding pattern (REP) type is often highly redundant as it may contain a plurality of blocks of reference patterns wherein each block in fact represents the same encoded data (due to the very high encoding capacity of one reference pattern it is possible to mark several identical two-dimensional patterns on a substrate in spite of limited available space), some blocks being possibly different in appearance as corresponding to different (allowed) representations of the same reference patterns (in case different representations encode the same data). In this case, it may be sufficient to detect only few validated representations on a converted digital image for even a single one-dimensional color space, to decode the data contained in the whole two-dimensional pattern.

For better reliability, it is possible to use a plurality of distinct one-dimensional color spaces to form corresponding converted digital images and perform the above steps of detection of the states of the symbols of the two-dimensional pattern to obtain a candidate representation, and search for a one-to-one mapping between the candidate representation and a known representation of a test reference pattern, for each one of these converted digital images. This is particularly useful in case some parameter values cannot be obtained for some symbol(s), e.g. due to a local (color) effect of the background on some elements of a symbol for a given converted digital image. Using several one-dimensional color spaces allows eliminating ambiguities in some image processing results: e.g. a state of a symbol cannot be determined in one converted digital image, while it is detected and coherent with the states of the other neighboring symbols, in another converted digital image. Also, a reference pattern can be considered as invalid (not allowed) in one converted digital image, while it is detected as valid (i.e. in one-to-one mapping with an allowed representation of a test reference pattern) from a converted image in another one-dimensional color space. The operations of decoding a two-dimensional pattern involve detecting and decoding each of the reference patterns it contains. A data content of a reference pattern of a two-dimensional pattern on a digital image (in a multidimensional color space) can thus be reliably decoded once a representation of said reference pattern corresponding to a validated representation of a test reference pattern has been found from a converted digital image of said two-dimensional pattern in a certain one-dimensional color space.

Preferably, the detection of the reference patterns of the two-dimensional pattern is thus performed on a set of distinct converted digital images, respectively corresponding to a conversion of the original digital image of the two-dimensional pattern taken by the reader into distinct one-dimensional color spaces, so as to increase the chances of successfully detect a representation of most, if not all, of the reference patterns, and thus increase the chances of fully decoding the two-dimensional pattern. The decoding phase can be performed according to different ways: for example,
each time a validated representation of a reference pattern is obtained from a certain converted digital image, via a one-to-one mapping of symbol states with a valid candidate representation of a selected test reference pattern, it can be decoded by the processing unit of the reader and the result of this decoding operation can be stored in the memory of the reader, and once all the reference patterns have been decoded (possibly from different converted digital images) the full decoding of the two-dimensional pattern has been realized; or the operations of detection of the representations of the reference patterns of the two-dimensional pattern are first performed for a certain number of distinct converted digital images (for distinct one-dimensional color spaces) and the resulting validated representations of the reference patterns are stored in the memory, and then the decoding is performed by considering the maximum number of distinct validated representations of the reference patterns from the set of all the obtained validated representations from all the converted digital images.

At least some of the above mentioned operations of image processing and/or decoding of the reference patterns of the image of the two-dimensional pattern acquired by the imaging unit of the reader may equivalently be performed in a distant server (respectively equipped with image processing and/or decoding capabilities) connected via a communication link with a communication unit of the reader. Moreover, a result of the decoding operation may be displayed on a screen of the reader or a screen connected with the server.

The above disclosed subject matter is to be considered illustrative, and not restrictive, and serves to provide a better understanding of the invention defined by the independent claims.

REFERENCES

[1] ISO/IEC 16022, Information technology—Automatic identification and data capture techniques—Data Matrix bar code symbology specification, $2^{nd}$ ed. 2006 Sep. 15.
[2] ISO/IEC 15415, Information technology—Automatic identification and data capture techniques—Bar code print quality test specification—Two-dimensional symbols, $2^{nd}$ ed. 2011 Dec. 15.
[3] N. Otsu (1979): "A threshold selection method from gray-level histograms", IEEE Transactions on Systems, Man, and Cybernetics, vol. 9 (1), 62-66, January 1979.

The invention claimed is:

1. A method of reading data encoded in a two-dimensional pattern applied on a non-uniform background of a surface of a substrate, the two-dimensional pattern comprising at least one reference pattern from a finite set of allowed reference patterns, each reference pattern comprising a specific arrangement of a plurality of symbols belonging to a finite set of two-dimensional symbols, each symbol in the arrangement coding a portion of said data, a state of a symbol consisting in a specific arrangement of a plurality of two-dimensional elements (E1, E2) within the symbol, each element E being characterized by a corresponding value of a parameter p(E), the parameter of one element E1 of each state of a symbol having a value different from a value of a parameter of at least one other element E2 of the state, comprising:

acquiring a digital image of the two-dimensional pattern with an imaging unit of a reader having a processing unit and a memory, each pixel of the acquired digital image having associated corresponding values in a multidimensional color space, and storing the acquired digital image in the memory;

converting via the processing unit the pixel values of the acquired digital image into a one-dimensional color space to form a converted digital image by mapping the values associated with each pixel of the acquired digital image to one corresponding value in said one-dimensional color space, and storing the converted digital image in the memory;

scanning via the processing unit the converted digital image through a window and detecting reference patterns of the two-dimensional pattern, the window delineating a block of pixels of the converted digital image corresponding to a size of a reference pattern above which said window is positioned, by carrying out the operations of:
 (i) selecting a test reference pattern among the set of allowed reference patterns stored in the memory;
 (ii) selecting a window position with respect to the converted digital image to delineate a block of pixels of the converted digital image;
 (iii) for each symbol of the test reference pattern, determining a state to the symbol by detecting through the window the respective parameter values of an arrangement of elements at a location on the converted digital image corresponding to that of said symbol in the test reference pattern, and by respectively assigning the detected parameter values to corresponding elements within the symbol, storing in the memory the assigned parameter values of its respective elements, the symbol having thus an assigned state comprising a pair of elements (E1, E2) wherein a first element E1 of the pair has an assigned parameter value p(E1) less than an assigned parameter value p(E2) of a second element E2 of the pair;
 (iv) determining that a candidate representation of the test reference pattern, wherein each symbol of the test reference pattern has the assigned state given by the corresponding stored assigned parameter values of its respective elements, constitutes a valid representation of the test reference pattern only if the parameter value of each first element of any symbol of the candidate representation is less than the respective parameter values of the second elements of neighboring symbols; and
 (a) in case the candidate representation of the test reference pattern constitutes a valid representation of the test reference pattern, storing in the memory an indication that a reference pattern corresponding to the block of pixels on the converted digital image has a validated representation corresponding to said valid representation of the test reference pattern, shifting the window by at least one pixel at a new position corresponding to another block of pixels on the converted digital image, and performing (i) to (iv) with said another block of pixels; or
 (b) in case the candidate representation of the test reference pattern does not constitute a valid representation of the test reference pattern, performing (i) to (iv) with another test reference pattern, selected among the remaining allowed reference patterns stored in the memory, in place of the test reference pattern; and decoding via the processing unit the data encoded in a reference pattern of the two-dimensional pattern by decoding the symbols of a corresponding validated representation of a selected test reference pattern.

2. The method according to claim 1, wherein at (iv) the candidate representation of the test reference pattern constitutes a valid representation of said test reference pattern only if the parameter value of each first element of any symbol of the candidate representation is less than the respective parameter values of the second elements of all the other symbols of the candidate representation.

3. The method according to claim 1, wherein any state of the symbols of the allowed reference patterns comprises at least one corresponding pair of elements.

4. The method according to claim 3, wherein any representation of the allowed reference patterns comprises at least eight symbols, each symbol having its state represented by a corresponding pair of elements.

5. The method according to claim 1, wherein the one dimensional color space is formed by assigning to each pixel of the acquired digital image a value resulting from a sum of weighted associated values of said pixel.

6. The method according to claim 1, further comprising:
 converting via the processing unit the pixel values of the acquired digital image into a new one-dimensional color space, distinct from the one-dimensional color space, to form a new converted digital image by mapping the values associated with each pixel of the acquired digital image to one corresponding value in said new one-dimensional color space, and storing the new converted digital image in the memory;
 performing the operation of scanning via the processing unit the new converted digital image through the window and detecting reference patterns of the two-dimensional pattern, and performing the operations (i) to (iv) with said new converted digital image in place of the converted digital image to obtain a validated representation of a selected test reference pattern; and
 performing the operation of decoding via the processing unit the data encoded in a reference pattern of the two-dimensional pattern by decoding the symbols of at least one corresponding validated representation of a selected test reference pattern.

7. A reader equipped with an imaging unit, a processing unit and a memory, operable to acquire and perform image processing of a digital image of a two-dimensional pattern applied on a non-uniform background of a surface of a substrate and representing encoded data, the two-dimensional pattern comprising at least one reference pattern from a finite set of allowed reference patterns stored in the memory, each symbol in the arrangement coding of a portion of said data, a state of a symbol consisting in a specific arrangement of a plurality of two-dimensional elements (E1, E2) within the symbol, each element E being characterized by a corresponding value of a parameter p(E), the parameter of one element E1 of each state of a symbol having a value different from a value of a parameter of at least one other element E2 of the state, being further adapted to:
 acquire a digital image of the two-dimensional pattern with the imaging unit, each pixel of the acquired digital image having associated corresponding values in a multidimensional color space, and store the acquired digital image in the memory;
 convert via the processing unit the pixel values of the acquired digital image into a one-dimensional color space to form a converted digital image by mapping the values associated with each pixel of the acquired digital image to one corresponding value in said one-dimensional color space, and store the converted digital image in the memory;

scan the converted digital image through a window and detect reference patterns of the two-dimensional pattern via image processing running on the processing unit, the window isolating a block of pixels of the converted digital image corresponding to a size of a reference pattern above which said window is positioned, by carrying out via the processing unit the operations of:
  (i) selecting a test reference pattern among the set of allowed reference patterns stored in the memory;
  (ii) selecting a window position with respect to the converted digital image to isolate a block of pixels of the converted digital image;
  (iii) for each symbol of the test reference pattern, determining a state of the symbol by detecting through the window the respective parameter values of an arrangement of elements at a location on the converted digital image corresponding to that of said symbol in the test reference pattern, and by respectively assigning the detected parameter values to corresponding elements within the symbol, storing in the memory the assigned parameter values of its respective elements, the symbol having thus an assigned state comprising a pair of elements (E1, E2) wherein a first element E1 of the pair has an assigned parameter value p(E1) less than an assigned parameter value p(E2) of a second element E2 of the pair;
  (iv) determining that a candidate representation of the test reference pattern, wherein each symbol of the test reference pattern has the assigned state given by the corresponding stored assigned parameter values of its respective elements, constitutes a valid representation of the test reference pattern only if the parameter value of each first element of any symbol of the candidate representation is less than the respective parameter values of the second elements of neighboring symbols; and
  (a) in case the candidate representation of the test reference pattern constitutes a valid representation of the test reference pattern, storing in the memory an indication that a reference pattern corresponding to the block of pixels on the converted digital image has a validated representation corresponding to said valid representation of the test reference pattern, shifting the window by at least on pixel at a new position corresponding to another block of pixels on the converted digital image, and performing (i) to (iv) with said another block of pixels; or
  (b) in case the candidate representation of the test reference pattern does not constitute a valid representation of the test reference pattern, performing (i) to (iv) with another test reference pattern, selected among the remaining allowed reference patterns stored in the memory, in place of the test reference pattern; and decoding via the processing unit the data encoded in a reference pattern of the two-dimensional pattern by decoding the symbols of a corresponding validated representation of a selected test reference pattern.

8. The reader according to claim 7, wherein the processing unit determines that the candidate representation of the test reference pattern constitutes a valid representation of said test reference pattern only if the parameter value of each first element of any symbol of the candidate representation is less than the respective parameter values of the second elements of all the other symbols of the candidate representation.

9. The reader according to claim 7, wherein any state of the symbols of the allowed reference patterns comprises at least one corresponding pair of elements.

10. The reader according to claim 9, wherein any representation of the allowed reference patterns comprises at least eight symbols, each symbol having its state represented by the corresponding pair of elements.

11. The reader according to claim 7, wherein the processing unit forms the one dimensional color space by assigning to each pixel of the acquired digital image a value resulting from a sum of weighted associated values of said pixel.

12. The reader according to claim 7, further adapted to:
  convert via the processing unit the pixel values of the acquired digital image into a new one-dimensional color space, distinct from the one-dimensional color space, to form a new converted digital image by mapping the values associated with each pixel of the acquired digital image to one corresponding value in said new one-dimensional color space, and storing the new converted digital image in the memory;
  perform the operation of scanning via the processing unit the new converted digital image through the window and detecting reference patterns of the two-dimensional pattern, and perform operations (i) to (iv) with said new converted digital image in place of the converted digital image to obtain a validated representation of a selected test reference pattern; and
  perform the operation of decoding via the processing unit the data encoded in a reference pattern of the two-dimensional pattern by decoding the symbols of at least one corresponding validated representation of a selected test reference pattern.

* * * * *